(12) United States Patent
Numa

(10) Patent No.: US 10,071,608 B2
(45) Date of Patent: Sep. 11, 2018

(54) WORK VEHICLE, METHOD FOR OPERATING TOW APPARATUS, AND METHOD FOR ASSEMBLING TOW APPARATUS

(71) Applicant: KOMATSU LTD., Tokyo (JP)

(72) Inventor: Yasutaka Numa, Komatsu (JP)

(73) Assignee: KOMATSU LTD., Tokyo (JP)

( * ) Notice: Subject to any disclaimer, the term of this patent is extended or adjusted under 35 U.S.C. 154(b) by 224 days.

(21) Appl. No.: 15/039,563

(22) PCT Filed: Feb. 16, 2016

(86) PCT No.: PCT/JP2016/054475
§ 371 (c)(1),
(2) Date: May 26, 2016

(87) PCT Pub. No.: WO2016/114408
PCT Pub. Date: Jul. 21, 2016

(65) Prior Publication Data
US 2017/0166021 A1 Jun. 15, 2017

(30) Foreign Application Priority Data
Dec. 10, 2015 (EP) .................................. 15199300

(51) Int. Cl.
*B60D 1/02* (2006.01)
*B60D 1/28* (2006.01)
(Continued)

(52) U.S. Cl.
CPC .............. *B60D 1/02* (2013.01); *B60D 1/025* (2013.01); *B60D 1/28* (2013.01); *F16B 19/02* (2013.01); *B60D 2001/544* (2013.01)

(58) Field of Classification Search
CPC . B60D 1/02; B60D 1/025; B60D 1/28; B60D 2001/544; F16B 19/02; F16B 41/002; F16B 21/02
See application file for complete search history.

(56) References Cited

U.S. PATENT DOCUMENTS 2,140,132 A * 12/1938 Hollett ..................... B60D 1/02
280/492
2,654,613 A 10/1953 Blair et al.
(Continued)

FOREIGN PATENT DOCUMENTS

JP     S58-45105 U     9/1981
JP     H06-127227 A    5/1994
(Continued)

*Primary Examiner* — Mark T Le
(74) *Attorney, Agent, or Firm* — Drinker Biddle & Reath LLP

(57) ABSTRACT

A tow pin has a main body portion in a columnar shape and a first protrusion protruding outward from an outer circumferential surface of the main body portion. An upper bracket structure has a first through hole in which the main body portion is inserted and restricts passage of the first protrusion. A lower bracket is located under the upper bracket structure at a distance from the upper bracket structure and has a second through hole in which the tow pin can be inserted. The main body portion of the tow pin is inserted in at least the first through hole and the first protrusion is located under the upper bracket structure.

14 Claims, 18 Drawing Sheets

(51) Int. Cl.
    *F16B 19/02* (2006.01)
    *B60D 1/54* (2006.01)

(56) References Cited

U.S. PATENT DOCUMENTS 2,660,444 A 11/1953 Cade et al.
2004/0251660 A1 12/2004 Roe et al.

FOREIGN PATENT DOCUMENTS

JP 2001-010316 A 1/2001
JP 2005-529776 A 10/2005

\* cited by examiner

WORK VEHICLE, METHOD FOR OPERATING TOW APPARATUS, AND METHOD FOR ASSEMBLING TOW APPARATUS

TECHNICAL FIELD

The present invention relates to a work vehicle, a method for operating a tow apparatus, and a method for assembling a tow apparatus, and particularly to a work vehicle having a tow apparatus, a method for operating a tow apparatus, and a method for assembling a tow apparatus.

BACKGROUND ART

In towing by a work vehicle, a tow pin is used. This tow pin is attached to a log weight vertically divided into two parts in the work vehicle. Towing is carried out with a wagon to be towed being attached to this tow pin.

For example, Japanese Patent Laying-Open No. 2001-10316 discloses a vehicle including such a tow pin. This publication discloses a tow bracket disposed in a vehicular body of a towing tractor, a draw bar pin provided such that it can be moved upward and downward with respect to the tow bracket, and a bounce prevention member.

The tow bracket has an upper bracket and a lower bracket each having a coupling hole for inserting the draw bar pin. A drop prevention member is attached to the draw bar pin. The drop prevention member has a main body portion and a projection projecting radially outward from the main body portion. The bounce prevention member has a through hole greater in diameter than the main body portion of the drop prevention member and a notch portion through which the projection can be inserted.

By pivoting the draw bar pin after the drop prevention member is inserted through an insertion hole and the notch portion in this bounce prevention member, the projection of the drop prevention member is set so as not to be located directly under the notch portion of the bounce prevention member. Thus, since the projection abuts to the bounce prevention member even though bouncing force is applied to the draw bar pin, the draw bar pin is not bounced and the draw bar pin does not come off from the coupling hole in the tow bracket.

CITATION LIST

Patent Document
PTD 1: Japanese Patent Laying-Open No. 2001-10316

SUMMARY OF INVENTION

Technical Problem

When a tow pin as above is employed, the tow apparatus should satisfy two conditions below such that the tow pin does not fall from the work vehicle.

(A) The tow pin is permanently attached to the work vehicle.

(B) When a holder (a lynchpin) holding the tow pin on the work vehicle is attached, the holder is undetachable from the work vehicle.

In the apparatus described in the document above, however, if the draw bar pin is rotated such that the projection of the drop prevention member is located directly under the notch portion of the bounce prevention member, the draw bar pin will readily come upward out of the bounce prevention member.

In order to satisfy (A) and (B), the tow pin (or the holder) may be connected to the work vehicle through a chain or a wire. When a chain or a wire is used, however, a flaw in the work vehicle will be made by the chain or the wire.

The present invention was made in view of the problems above, and an object thereof is to provide a work vehicle in which a tow pin cannot be removed upward from a bracket simply by rotating the tow pin and a flaw can be prevented, a method for operating a tow apparatus, and a method for assembling a tow apparatus.

Solution to Problem

A work vehicle according to the present invention is a work vehicle having a tow apparatus, and includes a tow pin, an upper bracket structure, and a lower bracket. The tow pin has a main body portion in a columnar shape and a first protrusion protruding outward from an outer circumferential surface of the main body portion. The upper bracket structure has a first through hole in which the main body portion is inserted, and restricts passage of the first protrusion. The lower bracket is located under the upper bracket structure at a distance from the upper bracket structure and has a second through hole in which the tow pin can be inserted. The main body portion of the tow pin is inserted in at least the first through hole and the first protrusion is located under the upper bracket structure.

According to the work vehicle in the present invention, the upper bracket structure restricts passage of the first protrusion. Therefore, in a state that the main body portion of the tow pin is inserted in the first through hole such that the first protrusion is located under the upper bracket structure, the tow pin does not come off upward from the upper bracket structure. Therefore, the tow pin cannot be removed upward from the upper bracket structure simply by rotating the tow pin.

In addition, since it is not necessary to use a chain or a wire for preventing the tow pin from coming off, a flaw in the work vehicle can be prevented.

In the work vehicle, the first through hole has a first main body insertion portion and a first recess portion. The first main body insertion portion has a two-dimensional shape greater than an outer circumferential shape of the columnar shape of the main body portion. The first recess portion is connected to an outer circumference of the first main body insertion portion and has a two-dimensional shape smaller than an outer circumferential shape of the first protrusion. The second through hole has a second main body insertion portion and a second recess portion. The second main body insertion portion has a two-dimensional shape greater than the outer circumferential shape of the columnar shape of the main body portion. The second recess portion is connected to an outer circumference of the second main body insertion portion and has a two-dimensional shape greater than the outer circumferential shape of the first protrusion.

Thus, the first recess portion of the upper bracket structure has a two-dimensional shape smaller than the outer circumferential shape of the first protrusion. Therefore, so long as the main body portion of the tow pin is inserted in at least the first main body insertion portion and the first protrusion is located under the upper bracket structure, the first protrusion cannot pass through the first recess portion even though the tow pin is pulled upward. Therefore, the tow pin cannot be removed upward from the upper bracket structure simply by rotating the tow pin.

In addition, since it is not necessary to use a chain or a wire for preventing the tow pin from coming off, a flaw in the work vehicle can be prevented.

In the work vehicle, the upper bracket structure has an upper bracket having a third through hole and a plate arranged on the upper bracket and having a fourth through hole. The third through hole has a third main body insertion portion having a two-dimensional shape greater than the outer circumferential shape of the columnar shape of the main body portion and a third recess portion connected to an outer circumference of the third main body insertion portion and having a two-dimensional shape greater than the outer circumferential shape of the first protrusion. The fourth through hole has a fourth main body insertion portion having a two-dimensional shape greater than the outer circumferential shape of the columnar shape of the main body portion, a fourth recess portion connected to an outer circumference of the fourth main body insertion portion and having a two-dimensional shape smaller than the outer circumferential shape of the first protrusion, and a fifth recess portion connected to the outer circumference of the fourth main body insertion portion and having a two-dimensional shape greater than the outer circumferential shape of the first protrusion. The third main body insertion portion and the fourth main body insertion portion implement the first main body insertion portion as being vertically superimposed on each other, and the third recess portion and the fourth recess portion implement the first recess portion as being vertically superimposed on each other.

Since the upper bracket structure is thus constituted of the upper bracket and the plate, the tow pin can be inserted in the first through hole in the upper bracket structure.

In the work vehicle, the plate has a flat portion having the fourth main body insertion portion and the fourth recess portion and a rotation stop portion connected to the flat portion and protruding upward from the flat portion.

Thus, a position where rotation of the tow pin is stopped at the time when the tow pin is rotated with the tow pin being inserted in the first through hole in the upper bracket structure and the second through hole in the lower bracket can be defined by the rotation stop portion.

In the work vehicle, the tow pin includes a handle portion arranged in the main body portion. The handle portion has an extension portion protruding outward from the outer circumferential surface of the main body portion. The rotation stop portion is located in a trace of rotation of the extension portion when the main body portion of the tow pin is rotated while the main body portion is inserted in the first main body insertion portion and the second main body insertion portion.

Thus, the extension portion of the handle portion can abut to the rotation stop portion and this position of abutment can be defined as the position where rotation of the tow pin is stopped.

In the work vehicle, the tow pin has a second protrusion. The second protrusion protrudes outward from the outer circumferential surface of the main body portion above the first protrusion and has a protrusion dimension smaller than an outward protrusion dimension of the first protrusion. The first recess portion has a two-dimensional shape greater than an outer circumferential shape of the second protrusion.

After the second protrusion is moved upward from below the upper bracket structure through the first recess portion, the tow pin is rotated such that the second protrusion is displaced from directly above the first recess portion, so that the second protrusion can be placed and held on the upper bracket structure. Since a worker does not have to hold the tow pin with his/her hand, he/she can handle a tow wire with both hands and operability in towing can be improved.

In the work vehicle, an interval in a vertical direction between the first protrusion and the second protrusion is equal to or greater than a thickness in the vertical direction of the upper bracket structure.

Thus, the second protrusion can be located above the upper bracket structure and the first protrusion can be located under the upper bracket structure. Therefore, the first protrusion can be prevented from interfering with the upper bracket structure when the second protrusion is rotated at a position above the upper bracket structure. Therefore, rotation of the second protrusion is prevented from being blocked by the first protrusion.

In the work vehicle, an interval in a vertical direction between the first protrusion and the second protrusion is equal to or greater than a thickness in the vertical direction of the lower bracket.

Thus, the second protrusion can be located above the lower bracket and the first protrusion can be located under the lower bracket. Therefore, the first protrusion can be prevented from interfering with the lower bracket when the second protrusion is rotated at a position above the lower bracket. Therefore, rotation of the second protrusion can be prevented from being blocked by the first protrusion.

In the work vehicle, the second protrusion is located directly above the first protrusion along a direction of axis of the columnar shape of the main body portion.

Thus, positioning of the first protrusion and the second protrusion is facilitated and design of the first recess portion and the second recess portion is facilitated.

In the work vehicle, the second through hole has a sixth recess portion connected to an outer circumference of the second main body insertion portion and having a two-dimensional shape smaller than the outer circumferential shape of the first protrusion and greater than the outer circumferential shape of the second protrusion. The sixth recess portion is connected to the second recess portion.

Thus, the second protrusion can rotate in the second recess portion and the sixth recess portion. By positioning the second protrusion in the sixth recess portion, the sixth recess portion is located directly above the first protrusion. Therefore, in this state, the first protrusion cannot pass through the lower bracket even though upward force is applied to the tow pin, and vertical swing of the tow pin can be suppressed.

In the work vehicle, the second protrusion is arranged in any of the second recess portion and the sixth recess portion while the main body portion of the tow pin is inserted in the second main body insertion portion and the third main body insertion portion.

Thus, as the second protrusion is arranged in any of the second recess portion and the sixth recess portion, the tow wire can be prevented from coming in contact with the second protrusion even though the tow wire is attached to the main body portion of the tow pin. Thus, damage of the second protrusion by the tow wire can be prevented.

A method for operating a tow apparatus according to the present invention is a method for operating a tow apparatus in the work vehicle described in any of the above and includes the steps below.

The tow pin is pulled upward such that the second protrusion passes through the first recess portion so as to be located above the upper bracket structure from a state that the main body portion of the tow pin is inserted in the second main body insertion portion and the third main body insertion portion. The second protrusion is placed and held on the upper bracket structure by rotating the tow pin with respect to the upper bracket structure such that the second protrusion moves to a position where the second protrusion is not superimposed on the first recess portion when viewed in a direction of axis of the columnar shape of the main body portion after the tow pin is pulled upward.

According to the method for operating the tow apparatus in the present invention, the second protrusion can be placed and held on the upper bracket structure by rotating the second protrusion so as to be displaced from directly above the first recess portion after the second protrusion is moved upward from below the upper bracket structure through the first recess portion. Thus, since a worker does not have to hold the tow pin with his/her hand, he/she can handle a tow wire with both hands and operability in a towing operation can be improved.

In the method for operating the tow apparatus, a gap is created between a lower end of the tow pin and the lower bracket while the second protrusion is placed and held on the upper bracket structure. The tow pin is rotated with respect to the upper bracket structure such that the second protrusion moves to a position where the second protrusion is superimposed on the second through hole when viewed in the direction of axis while the gap is created. The tow pin is pulled downward such that the second protrusion passes through the first recess portion and moves below the upper bracket structure and the tow pin is inserted in the first through hole and the second through hole after the tow pin is rotated. The tow pin is passed through a ring portion of a tow wire by making use of the gap, by pulling the tow pin downward.

By thus pulling the tow pin downward so as to insert the tow pin in the second through hole in the lower bracket after the tow pin is passed through the ring portion of the tow wire, the ring portion of the tow wire can be prevented from coming off from the tow pin.

In the method for operating the tow apparatus, the step of pulling the tow pin downward includes the step of pulling the tow pin downward until the first protrusion passes through the second recess portion and is located under the lower bracket. The tow pin is rotated with respect to the lower bracket such that the first protrusion moves to a position where the first protrusion is not superimposed on the second recess portion when viewed in the direction of axis while the first protrusion is located under the lower bracket.

As the first protrusion is thus displaced from directly under the second recess portion, the first protrusion cannot pass through the lower bracket even though upward force is applied to the tow pin, and vertical swing of the tow pin can be suppressed.

A method for assembling a tow apparatus according to the present invention is a method for assembling a tow apparatus in the work vehicle described in any of the above, and includes the steps below.

The plate is arranged on the upper bracket such that the fourth main body insertion portion of the plate is located directly above the third main body insertion portion of the upper bracket and the fifth recess portion of the plate is located directly above the third recess portion of the upper bracket. The main body portion of the tow pin is inserted through the fourth main body insertion portion of the plate and the third main body insertion portion of the upper bracket and the first protrusion of the tow pin is inserted through the fifth recess portion of the plate and the third recess portion of the upper bracket. The plate is rotated around the main body portion with respect to the upper bracket such that the fourth recess portion of the plate is located directly above the third recess portion of the upper bracket after the first protrusion of the tow pin is inserted through the fifth recess portion and the third recess portion. The plate is fixed to the upper bracket while the fourth recess portion is located directly above the third recess portion.

According to the method for assembling a tow apparatus in the present invention, the fifth recess portion of the plate is located directly above the third recess portion of the upper bracket, so that the first protrusion of the tow pin can penetrate the first through hole in the upper bracket structure. The fourth recess portion of the plate is located directly above the third recess portion of the upper bracket after the first protrusion of the tow pin penetrates the upper bracket structure, so that the first protrusion of the tow pin cannot penetrate the first through hole in the upper bracket structure. Thus, the tow pin can be attached so as not to come off from the upper bracket structure and the lower bracket.

Advantageous Effects of Invention

As described above, according to the present invention, a work vehicle in which a tow pin cannot be removed upward from a bracket simply by rotating the tow pin and a flaw can be prevented, a method for operating a tow apparatus, and a method for assembling a tow apparatus can be realized.

DESCRIPTION OF EMBODIMENTS

An embodiment of the present invention will be described below with reference to the drawings.

Initially, a construction of a work vehicle in one embodiment of the present invention will be described. A wheel loader representing one example of a work vehicle to which the concept of the present invention can be applied will be described below with reference to FIGS. 1 and 2. The present invention is applicable also to a work vehicle having a tow apparatus, such as a hydraulic excavator and a crawler dozer, other than the wheel loader.

In the present example, positional relation of portions will be described with an operator who is seated at an operator seat in a cab 41 being defined as the reference. A fore/aft direction refers to front and rear directions of the operator who is seated at the operator seat. A lateral direction (a width direction) refers to left and right directions of the operator who is seated at the operator seat. A vertical direction refers to upward and downward directions of the operator who is seated at the operator seat.

A direction which the operator seated at the operator seat faces is the fore direction, and a direction opposite to the fore direction is the aft direction. The right side and the left side at the time when the operator seated at the operator seat faces the front is right and left directions, respectively. A foot side of the operator who is seated at the operator seat refers to a lower side and a head side refers to an upper side.

Figure 1:
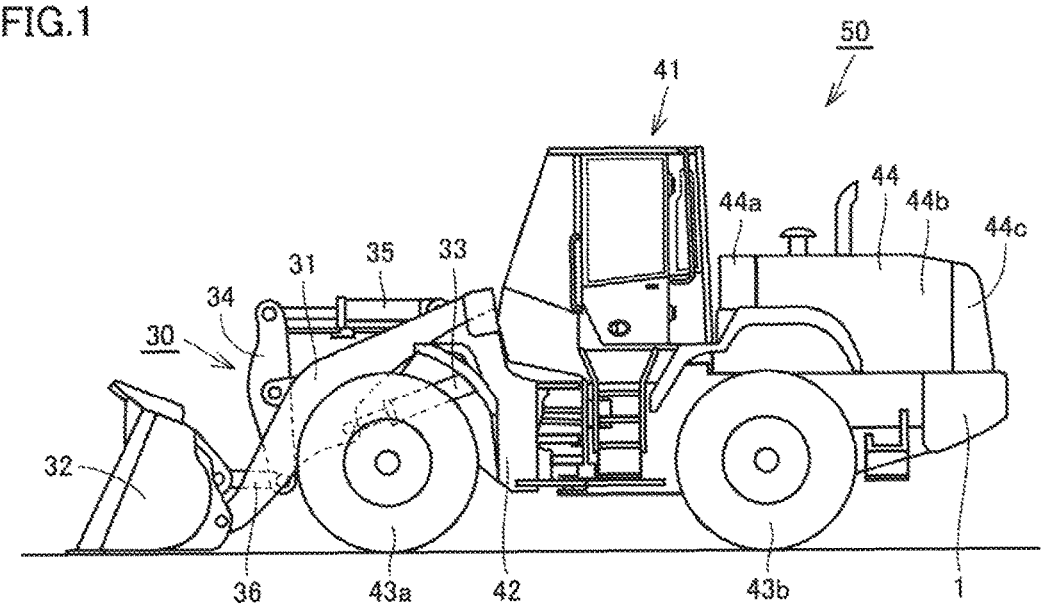
FIG. 1 is a schematic side view showing a construction of a wheel loader representing an example of a work vehicle in one embodiment of the present invention.
Figure 2:
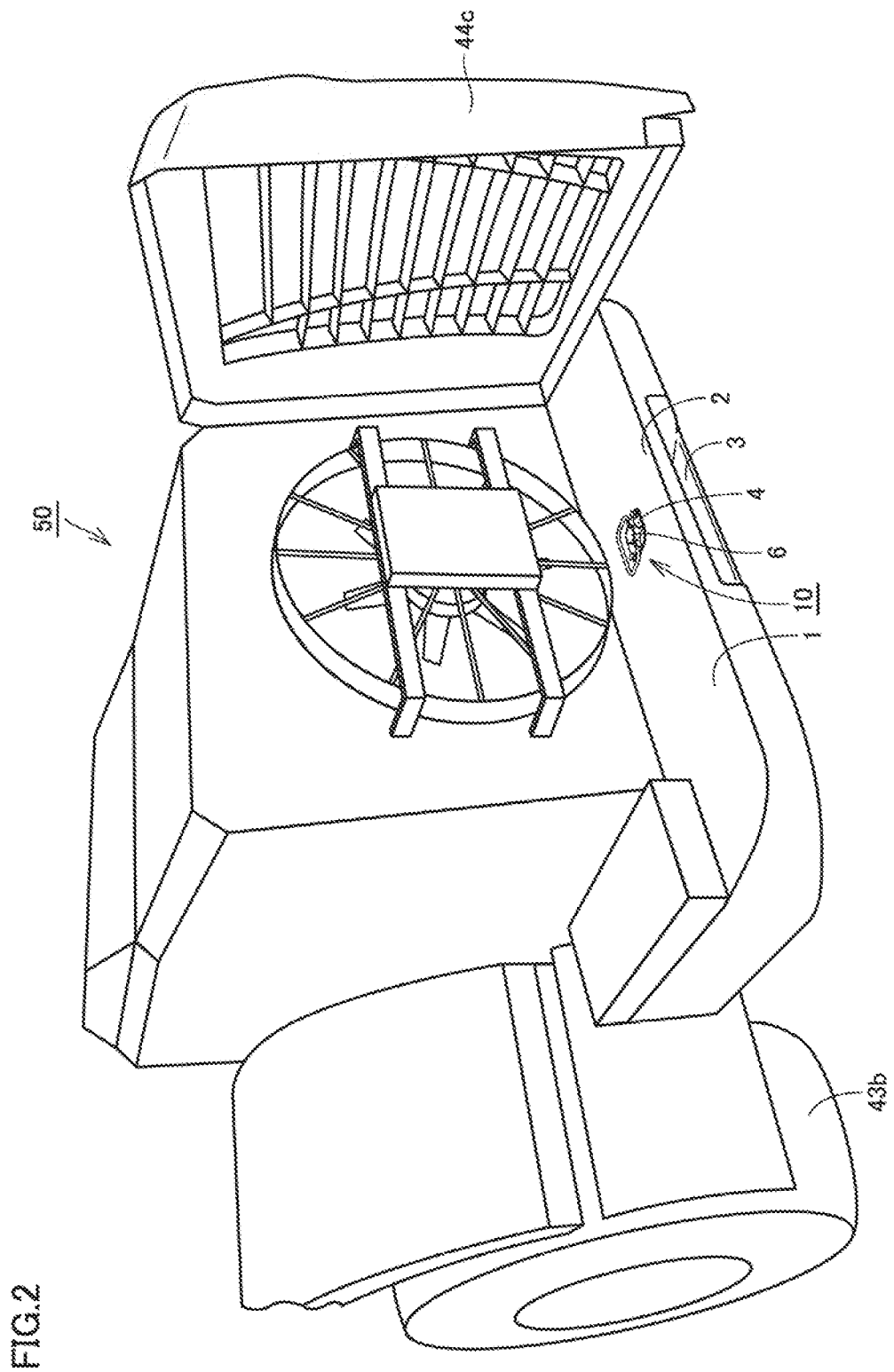
FIG. 2 is a perspective view from the rear of the wheel loader shown in FIG. 1.

FIG. 1 is a schematic side view showing a construction of a wheel loader representing an example of a work vehicle in one embodiment of the present invention. FIG. 2 is a perspective view from the rear of the wheel loader shown in FIG. 1.

As shown in FIG. 1, a wheel loader 50 in the present embodiment mainly has a front frame 42, a rear vehicular body 44, and a work implement 30. A front wheel 43a is attached to each of opposing side portions of front frame 42. A rear wheel 43b is attached to each of opposing side portions of rear vehicular body 44.

Front frame 42 and rear vehicular body 44 are attached to each other to freely laterally be actuated by means of a center pin (not shown). Front frame 42 and rear vehicular body 44 implement an articulated structure.

Specifically, front frame 42 and rear vehicular body 44 are coupled to each other by a pair of left and right steering cylinders (not shown). As these left and right steering cylinders extend and contract, front frame 42 and rear vehicular body 44 are laterally actuated and steered around the center pin. Front frame 42 and rear vehicular body 44 implement a vehicular body of wheel loader 50.

Work implement 30 is attached in front of front frame 42. Work implement 30 has a pair of booms 31, a bucket 32, a pair of boom cylinders 33, a bell crank 34, a bucket cylinder 35, and a link 36.

A base end portion of boom 31 is attached to front frame 42 such that boom 31 is freely actuated with respect to front frame 42. Bucket 32 is attached to a tip end portion of boom 31 so as to freely be actuated. Boom cylinder 33 couples front frame 42 and boom 31 to each other. As boom cylinder 33 extends and contracts, boom 31 is actuated with respect to front frame 42.

A substantially central portion of bell crank 34 is supported on boom 31 such that bell crank 34 is freely actuated with respect to boom 31. Bucket cylinder 35 couples a base end portion of bell crank 34 and front frame 42 to each other. Link 36 couples a tip end portion of bell crank 34 and bucket 32 to each other. As bucket cylinder 35 extends and contracts, bucket 32 is actuated with respect to boom 31.

An engine compartment 44b is arranged in a rear portion of rear vehicular body 44. A hydraulic oil tank 44a is arranged in front of engine compartment 44b. Rear vehicular body 44 has an operator's cab (for example, cab) 41 in front of hydraulic oil tank 44a. Operator's cab 41 forms a space for an operator to operate wheel loader 50 inside.

A counterweight 1 is attached in the rear of and below rear vehicular body 44. A pivot plate 44c is provided in the rear of rear vehicular body 44 and above counterweight 1.

As shown in FIG. 2, pivot plate 44c is pivotably attached to the vehicular body on a one end side in a direction of width. By opening this pivot plate 44c, the worker can access a fan and a radiator. While pivot plate 44c is opened, the worker can access a tow apparatus 10 provided in counterweight 1. Thus, tow apparatus 10 may be located directly under pivot plate 44c while pivot plate 44c is closed.

Tow apparatus 10 may be located as being displaced rearward from a position directly under pivot plate 44c. In this case, tow apparatus 10 is exposed outside pivot plate 44c in a closed state. Therefore, the worker can access tow apparatus 10 without opening pivot plate 44c.

A construction of tow apparatus 10 provided in wheel loader 50 will now be described with reference to FIGS. 3 to 8.

Figure 3:
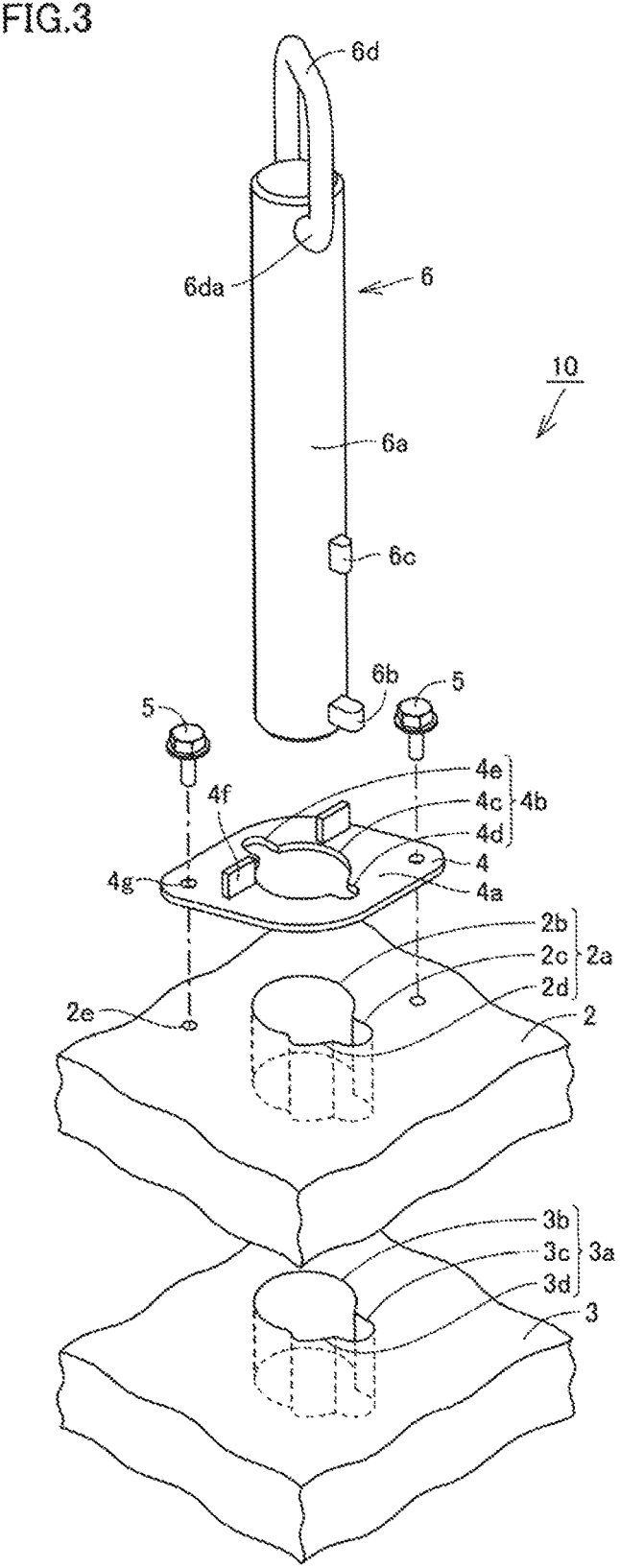
FIG. 3 is an exploded perspective view schematically showing a construction of a tow apparatus provided in the wheel loader shown in FIG. 2.
Figure 4:
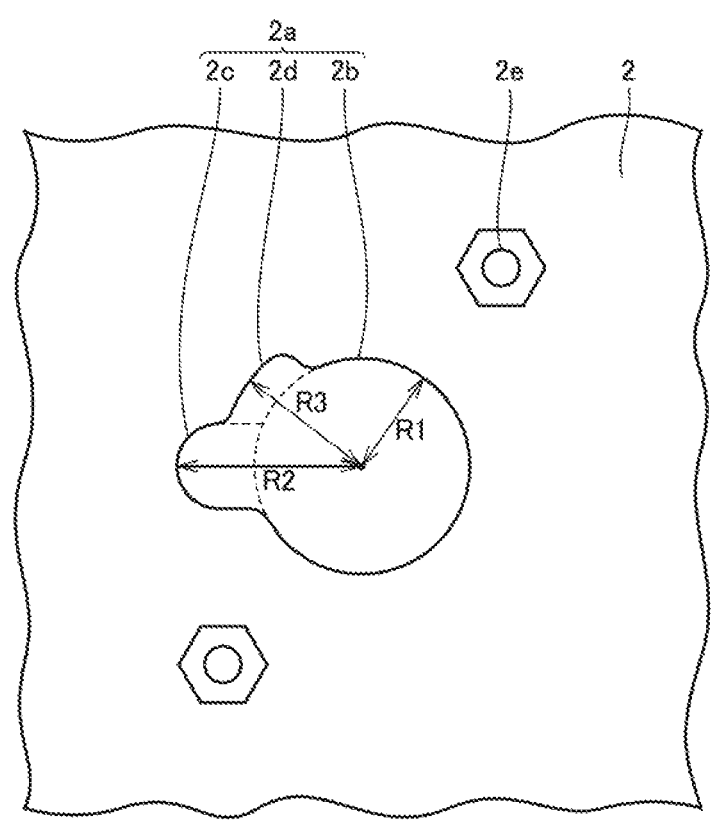
FIG. 4 is a plan view for illustrating a shape of a through hole provided in an upper bracket.
Figure 5:
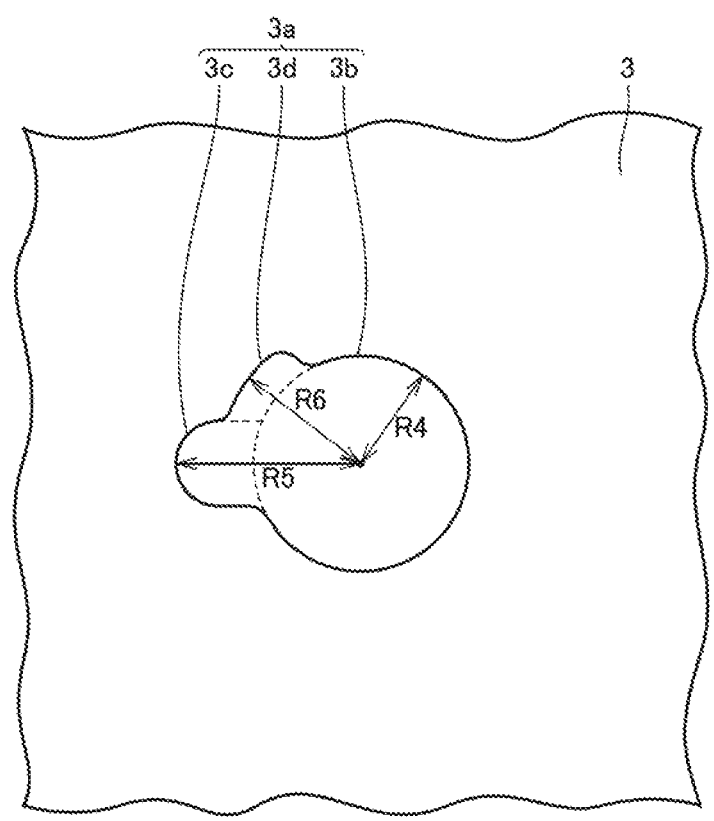
FIG. 5 is a plan view for illustrating a shape of a through hole provided in a lower bracket.
Figure 6:
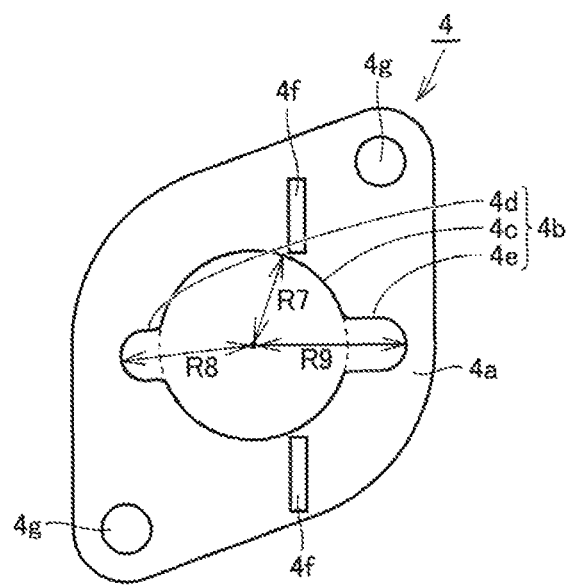
FIG. 6 is a plan view for illustrating a shape of a through hole provided in a plate.
Figure 7A:
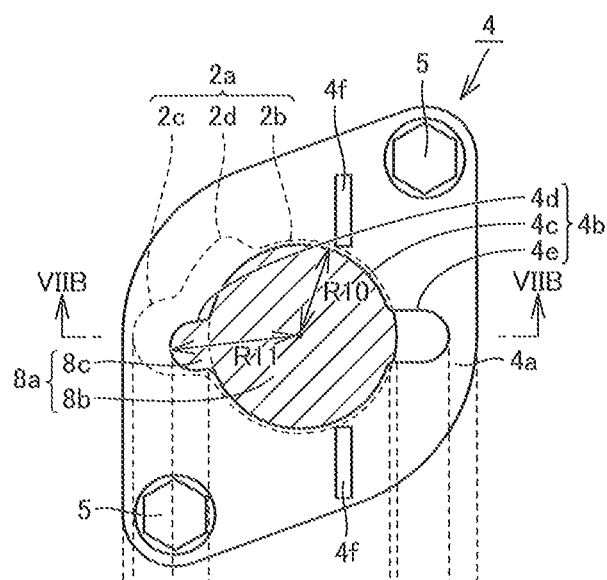
FIG. 7(A) is a plan view for illustrating a shape of a through hole provided in an upper bracket structure constituted of the upper bracket and the plate and FIG. 7(B) is a cross-sectional view along the line VIIB-VIIB in FIG. 7(A).
Figure 7B:
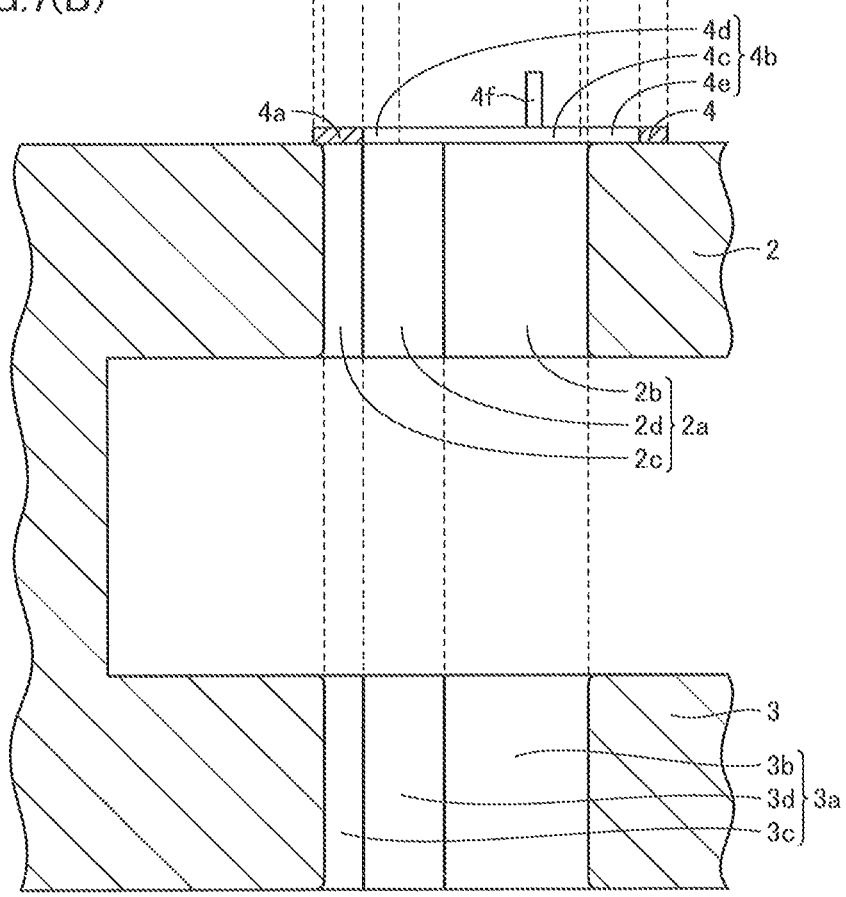
Figure 8:
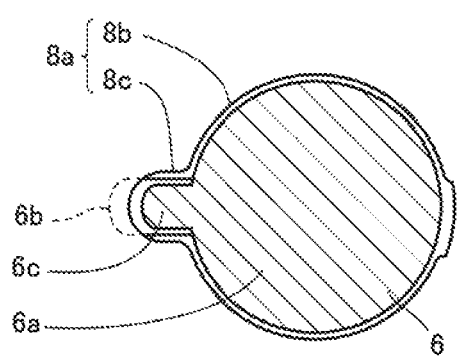
FIG. 8 is a partially cut-away plan view for illustrating relation between the through hole provided in the upper bracket structure and a tow pin.

FIG. 3 is an exploded perspective view schematically showing a construction of the tow apparatus provided in the wheel loader shown in FIG. 2. FIGS. 4, 5, and 6 are plan views for illustrating shapes of through holes provided in an upper bracket, a lower bracket, and a plate, respectively. FIG. 7(A) and FIG. 7(B) are a plan view for illustrating a shape of a through hole provided in an upper bracket structure constituted of the upper bracket and the plate and a cross-sectional view along the line VIIB-VIIB in FIG. 7(A), respectively. FIG. 8 is a partially cut-away plan view for illustrating relation between the through hole provided in the upper bracket structure and a tow pin.

As shown in FIG. 3, tow apparatus 10 mainly has an upper bracket 2, a lower bracket 3, a plate 4, a fixing member 5, and a tow pin 6. Upper bracket 2 and lower bracket 3 are integrated with counterweight 1 and forms a part of counterweight 1. Lower bracket 3 is located under upper bracket 2 at a distance from upper bracket 2.

Each of upper bracket 2 and lower bracket 3 has, for example, a flat shape. Upper bracket 2 and lower bracket 3 are arranged in parallel to each other.

Upper bracket 2 is provided with a through hole (third through hole) 2a. Through hole 2a penetrates upper bracket 2 from an upper surface to a lower surface thereof. Upper bracket 2 has a fixing member coupling portion 2e in its upper surface. This fixing member coupling portion 2e is implemented, for example, by a female screw portion.

Lower bracket 3 is provided with a through hole (second through hole) 3a. Through hole 3a penetrates lower bracket 3 from an upper surface to a lower surface thereof. Through hole 2a in upper bracket 2 and through hole 3a in lower bracket 3 are arranged to vertically be concentric with each other.

Plate 4 is made, for example, of a metal. Plate 4 has a flat portion 4a and a rotation stop portion 4f. Flat portion 4a is in a flat shape. Flat portion 4a is provided with a through hole (fourth through hole) 4b and a fixing member insertion hole 4g.

Rotation stop portion 4f is connected to flat portion 4a and protrudes upward from flat portion 4a. Rotation stop portion 4f is constituted, for example, of two projections. The two projections are arranged on opposing sides of through hole 4b such that through hole 4b lies therebetween. Each of the two projections extends linearly in a plan view. The two projections are arranged to extend along the same straight line in a plan view.

The plan view above means a point of view downward from above along a direction orthogonal to an upper surface of upper bracket 2.

Fixing member 5 serves to fix plate 4 to upper bracket 2 and implemented, for example, by a bolt. Fixing member 5 is coupled to fixing member coupling portion 2e of upper bracket 2 through fixing member insertion hole 4g in plate 4. Specifically, a male screw portion of bolt 5 is screwed into female screw portion 2e. Plate 4 is thus fixed to upper bracket 2. As plate 4 is fixed to upper bracket 2, the upper bracket structure is constituted of plate 4 and upper bracket 2.

While plate 4 is fixed to upper bracket 2, through hole 4b in plate 4 is located directly above through hole 2a in upper bracket 2. Through hole 2a in upper bracket 2 and through hole 4b in plate 4 are superimposed on each other in a plan view.

Tow pin 6 mainly has a main body portion 6a, a first protrusion 6b, a second protrusion 6c, and a handle portion 6d. Main body portion 6a has a columnar shape, and for example, has a cylindrical shape. Each of first protrusion 6b and second protrusion 6c protrudes outward from an outer circumferential surface of main body portion 6a.

Second protrusion 6c is located above first protrusion 6b and below handle portion 6d. Second protrusion 6c is located directly above first protrusion 6b along a direction of axis of the columnar shape of main body portion 6a. A protrusion dimension by which second protrusion 6c protrudes outward from the outer circumferential surface of main body portion 6a is smaller than a protrusion dimension by which first protrusion 6b protrudes outward from the outer circumferential surface of main body portion 6a.

An interval in the vertical direction between first protrusion 6b and second protrusion 6c is equal to or greater than a thickness in the vertical direction of upper bracket structure 2, 4 (a total of a thickness of upper bracket 2 and a thickness of plate 4). The interval in the vertical direction between first protrusion 6b and second protrusion 6c is equal to or greater than a thickness in the vertical direction of lower bracket 3.

Handle portion 6d is attached around an upper end of main body portion 6a. Handle portion 6d has such a shape that a central portion of one side of a rectangular frame is cut away. Main body portion 6a is attached to such a cut portion in handle portion 6d. Handle portion 6d is attached to main body portion 6a rotatably with respect to main body portion 6a.

Handle portion 6d has an extension portion 6da protruding outward from the outer circumferential surface of main body portion 6a. This extension portion 6da corresponds to portions extending from the cut portion in the rectangular frame toward opposing sides. Rotation stop portion 4f of plate 4 is located in a trace of rotation of extension portion 6da at the time when tow pin 6 is rotated while the tow pin is inserted in through holes 2a, 3a, and 4b.

As shown in FIG. 4, through hole 2a in upper bracket 2 has a main body insertion portion (third main body insertion portion) 2b, a recess portion (third recess portion) 2c, and a recess portion (seventh recess portion) 2d. Main body insertion portion 2b has a two-dimensional shape greater than the outer circumferential shape of the columnar shape of main body portion 6a of tow pin 6. Main body insertion portion 2b has, for example, an annular shape. Main body insertion portion 2b has a two-dimensional shape not allowing passage of first protrusion 6b and second protrusion 6c when main body portion 6a of tow pin 6 is inserted in main body insertion portion 2b.

Recess portion 2c is connected to an outer circumference of main body insertion portion 2b and has a two-dimensional shape greater than an outer circumferential shape of first protrusion 6b, with a radius R1 of main body insertion portion 2b being increased to a radius R2. Therefore, recess portion 2c has a two-dimensional shape allowing passage of both of first protrusion 6b and second protrusion 6c when main body portion 6a of tow pin 6 is inserted in main body insertion portion 2b.

Recess portion 2d is connected to the outer circumference of main body insertion portion 2b and has a two-dimensional shape smaller than the outer circumferential shape of first protrusion 6b and greater than an outer circumferential shape of second protrusion 6c with radius R1 of main body insertion portion 2b being increased to a radius R3. Therefore, recess portion 2d has a two-dimensional shape allowing passage of second protrusion 6c but not allowing passage of first protrusion 6b when main body portion 6a of tow pin 6 is inserted in main body insertion portion 2b. Recess portion 2d is connected also to an outer circumference of recess portion 2c.

As shown in FIG. 5, through hole 3a in lower bracket 3 is the same in shape as through hole 2a in upper bracket 2. Tow pin 6 can be inserted in through hole 3a in lower bracket 3. Through hole 3a in lower bracket 3 has a main body insertion portion (second main body insertion portion) 3b, a recess portion (second recess portion) 3c, and a recess portion (sixth recess portion) 3d. Main body insertion portion 3b has a two-dimensional shape greater than the outer circumferential shape of the columnar shape of main body portion 6a of tow pin 6. Main body insertion portion 3b has, for example, an annular shape. Main body insertion portion 3b has a two-dimensional shape not allowing passage of first protrusion 6b and second protrusion 6c when main body portion 6a of the tow pin is inserted in main body insertion portion 3b.

Recess portion 3c is connected to an outer circumference of main body insertion portion 3b and has a two-dimensional shape greater than the outer circumferential shape of first protrusion 6b with a radius R4 of main body insertion portion 3b being increased to a radius R5. Therefore, recess portion 3c has a two-dimensional shape allowing passage of both of first protrusion 6*b* and second protrusion 6*c* when main body portion 6*a* of tow pin 6 is inserted in main body insertion portion 3*b*.

Recess portion 3*d* is connected to the outer circumference of main body insertion portion 3*b* and has a two-dimensional shape smaller than the outer circumferential shape of first protrusion 6*b* and greater than the outer circumferential shape of second protrusion 6*c* with radius R4 of main body insertion portion 3*b* being increased to a radius R6. Therefore, recess portion 3*d* has a two-dimensional shape allowing passage of second protrusion 6*c* but not allowing passage of first protrusion 6*b* when main body portion 6*a* of tow pin 6 is inserted in main body insertion portion 3*b*. Recess portion 3*d* is connected also to an outer circumference of recess portion 3*c*.

As shown in FIG. 6, through hole (fourth through hole) 4*b* in plate 4 has a main body insertion portion (fourth main body insertion portion) 4*c*, a recess portion (fourth recess portion) 4*d*, and a recess portion (fifth recess portion) 4*e*. Main body insertion portion 4*c* has a two-dimensional shape greater than the outer circumferential shape of the columnar shape of main body portion 6*a* of tow pin 6. Main body insertion portion 4*c* has, for example, an annular shape. Main body insertion portion 4*c* has a two-dimensional shape not allowing passage of first protrusion 6*b* and second protrusion 6*c* when main body portion 6*a* of the tow pin is inserted in main body insertion portion 4*c*.

Recess portion 4*d* is connected to an outer circumference of main body insertion portion 4*c* and has a two-dimensional shape smaller than the outer circumferential shape of first protrusion 6*b* and greater than the outer circumferential shape of second protrusion 6*c* with a radius R7 of main body insertion portion 4*c* being increased to a radius R8. Therefore, recess portion 4*d* has a two-dimensional shape allowing passage of second protrusion 6*c* but not allowing passage of first protrusion 6*b* when main body portion 6*a* of tow pin 6 is inserted in main body insertion portion 4*c*.

Recess portion 4*e* is connected to the outer circumference of main body insertion portion 4*c* and has a two-dimensional shape greater than the outer circumferential shape of first protrusion 6*b* with radius R7 of main body insertion portion 4*c* being increased to a radius R9. Therefore, recess portion 4*e* has a two-dimensional shape allowing passage of both of first protrusion 6*b* and second protrusion 6*c* when main body portion 6*a* of tow pin 6 is inserted in main body insertion portion 4*c*. Recess portion 4*e* is not connected to an outer circumference of recess portion 4*d*. Recess portion 4*e* is arranged opposite to recess portion 4*d* with respect to the center of annular main body insertion portion 4*c*.

As shown in FIG. 7(A), such a two-dimensional shape that through hole 2*a* in upper bracket 2 and through hole 4*b* in plate 4 are superimposed on each other in a plan view while plate 4 is fixed to upper bracket 2 is the two-dimensional shape of a through hole (first through hole) 8*a* in upper bracket structure 2, 4. The two-dimensional shape of through hole 8*a* in upper bracket structure 2, 4 is represented as a shape of a hatched portion in FIG. 7(A).

Main body portion 6*a* of tow pin 6 can be inserted in through hole 8*a* in upper bracket structure 2, 4. Upper bracket structure 2, 4 restricts passage of first protrusion 6*b*. Therefore, first protrusion 6*b* cannot pass through through hole 8*a* in upper bracket structure 2, 4.

Through hole 8*a* in upper bracket structure 2, 4 has a main body insertion portion (first main body insertion portion) 8*b* and a recess portion (first recess portion) 8*c*. Main body insertion portion 8*b* is implemented as main body insertion portion 2*b* of upper bracket 2 and main body insertion portion 4*c* of plate 4 are vertically superimposed on each other. Recess portion 8*c* is implemented as recess portion 2*c* of upper bracket 2 and recess portion 4*d* of plate 4 are vertically superimposed on each other.

Main body insertion portion 8*b* has a two-dimensional shape greater than the outer circumferential shape of the columnar shape of main body portion 6*a* of tow pin 6. Main body insertion portion 8*b* has, for example, an annular shape. Main body insertion portion 8*b* has a two-dimensional shape not allowing passage of first protrusion 6*b* and second protrusion 6*c* when main body portion 6*a* of the tow pin is inserted in main body insertion portion 8*b*.

Recess portion 8*c* is connected to an outer circumference of main body insertion portion 8*b* and has a two-dimensional shape smaller than the outer circumferential shape of first protrusion 6*b* and greater than the outer circumferential shape of second protrusion 6*c* with a radius R10 of main body insertion portion 8*b* being increased to a radius R11. Therefore, as shown in FIG. 8, recess portion 8*c* has a two-dimensional shape allowing passage of second protrusion 6*c* but not allowing passage of first protrusion 6*b* when main body portion 6*a* of tow pin 6 is inserted in main body insertion portion 8*b*.

As shown in FIGS. 3 and 7(B), a direction of recess of recess portion 2*c* with respect to main body insertion portion 2*b* and a direction of recess of recess portion 3*c* with respect to main body insertion portion 3*b* are the same. In addition, a direction of recess of recess portion 2*d* with respect to main body insertion portion 2*b* and a direction of recess of recess portion 3*d* with respect to main body insertion portion 3*b* are the same. Therefore, as shown in FIG. 7(A), the two-dimensional shape of through hole 2*a* in upper bracket 2 and the two-dimensional shape of through hole 3*a* in lower bracket 3 are the same in a plan view.

A method for assembling the tow apparatus in the present embodiment will now be described with reference to FIG. 9(A) and FIG. 9(B) to FIG. 13(A) and FIG. 13(B).

FIG. 9(A) and FIG. 9(B) to FIG. 13(A) and FIG. 13(B) are perspective views and plan views showing the method for assembling the tow apparatus shown in FIG. 3 in a sequence of steps.

Figure 9A:
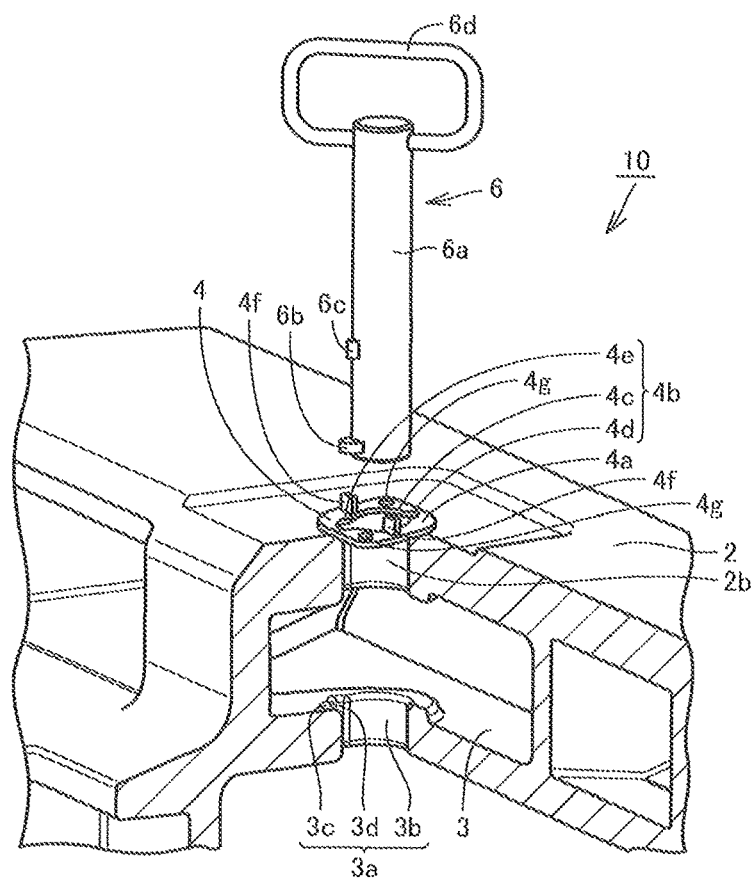
FIG. 9(A) is a perspective view and FIG. 9(B) is a plan view showing a first step in a method for assembling the tow apparatus shown in FIG. 3.
Figure 9B:
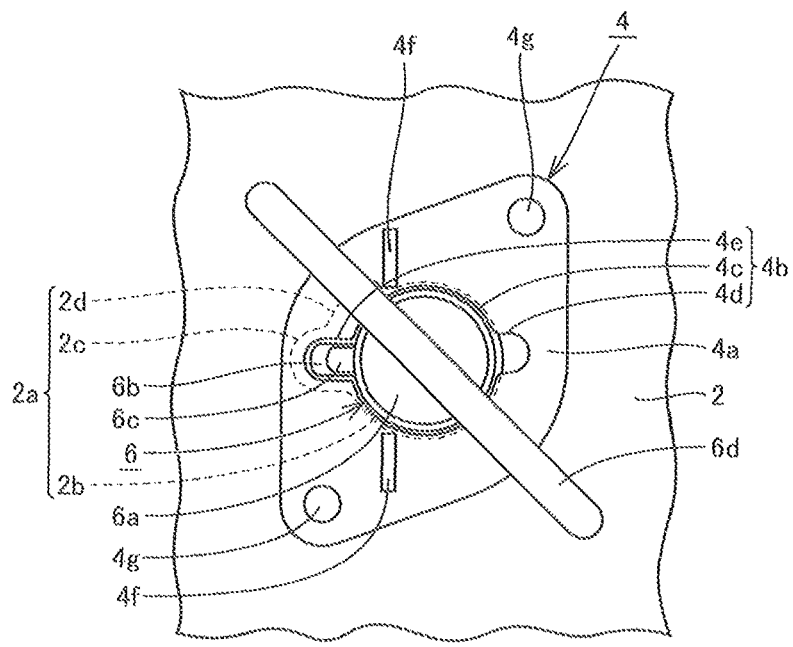

As shown in FIG. 9(A) and FIG. 9(B), initially, plate 4 is placed on upper bracket 2. In this state of placement, main body insertion portion 4*c* of plate 4 and main body insertion portion 2*b* of upper bracket 2 are superimposed on each other in a plan view and recess portion 4*e* of plate 4 and recess portion 2*c* of upper bracket 2 are superimposed on each other in a plan view. In this state of placement, plate 4 is merely placed on upper bracket 2 and not fixed to upper bracket 2. In this state of placement, tow pin 6 is pulled downward. Thus, main body portion 6*a* of tow pin 6 is inserted in main body insertion portion 4*c* of plate 4 and main body insertion portion 2*b* of upper bracket 2 and first protrusion 6*b* of tow pin 6 is inserted in recess portion 4*e* of plate 4 and recess portion 2*c* of upper bracket 2.

Figure 10A:
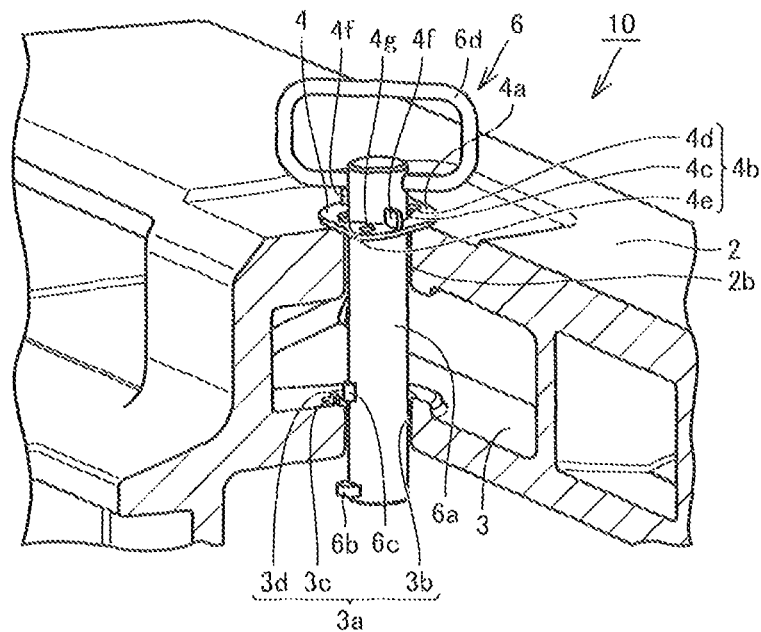
FIG. 10(A) is a perspective view and FIG. 10(B) is a plan view showing a second step in the method for assembling the tow apparatus shown in FIG. 3.
Figure 10B:
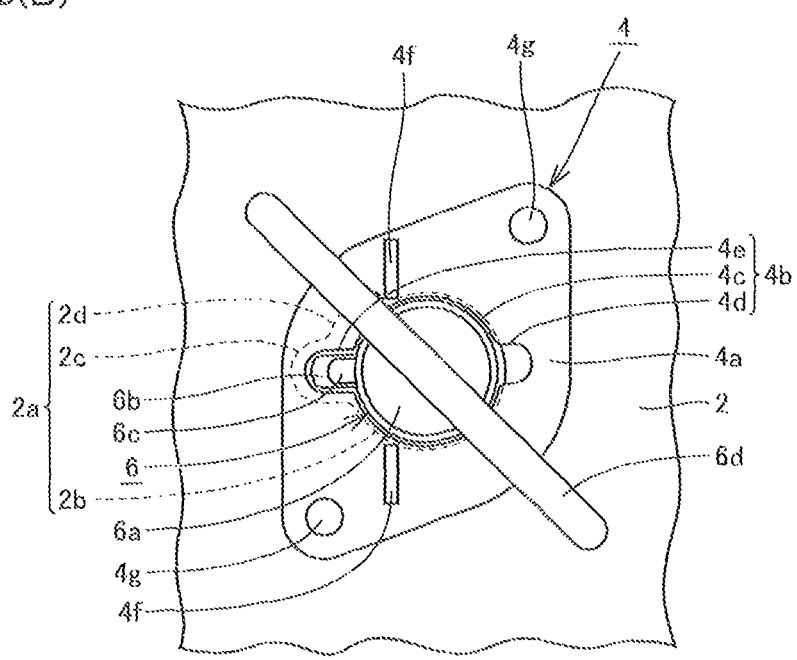

As shown in FIG. 10(A) and FIG. 10(B), tow pin 6 is further pulled downward so that first protrusion 6*b* and second protrusion 6*c* of tow pin 6 penetrate plate 4 and upper bracket 2 and are located under upper bracket 2. As tow pin 6 is further pulled downward, main body portion 6*a* of tow pin 6 is inserted in main body insertion portion 3*b* of lower bracket 3 and first protrusion 6*b* of tow pin 6 is inserted in recess portion 3*c* of lower bracket 3.

Figure 11A:
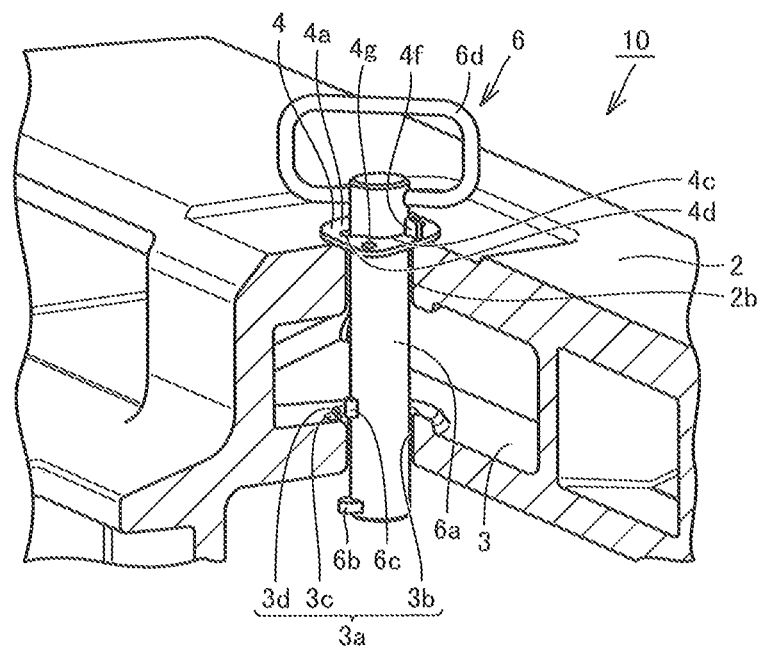
FIG. 11(A) is a perspective view and FIG. 11(B) is a plan view showing a third step in the method for assembling the tow apparatus shown in FIG. 3.
Figure 11B:
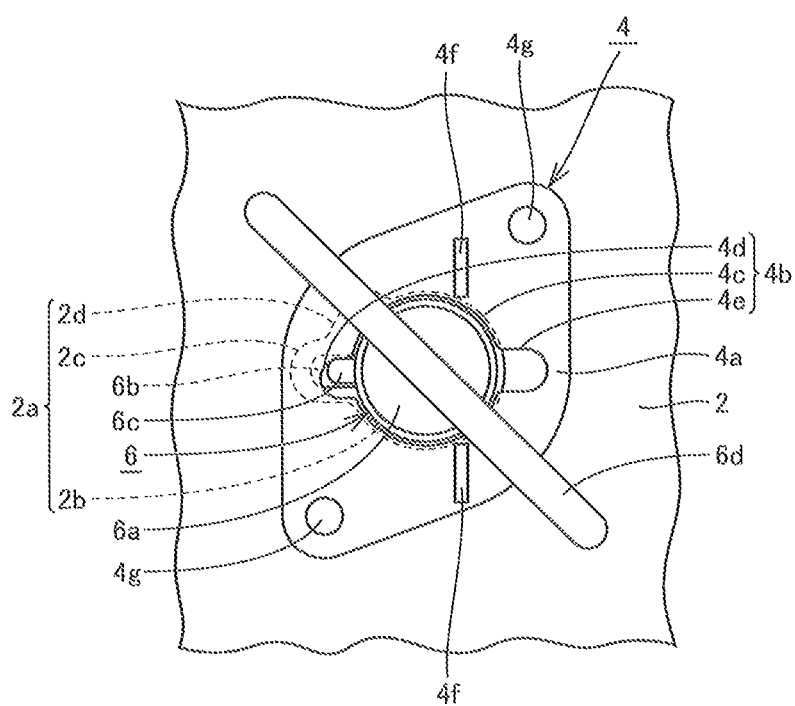

As shown in FIG. 11(A) and FIG. 11(B), plate 4 is rotated around main body portion 6*a* of tow pin 6 with respect to upper bracket 2 while tow pin 6 is lifted such that handle portion 6*d* of tow pin 6 does not come in contact with an upper surface of plate 4. As a result of this rotation, recess portion 4d of plate 4 is superimposed on recess portion 2c of upper bracket 2.

Figure 12A:
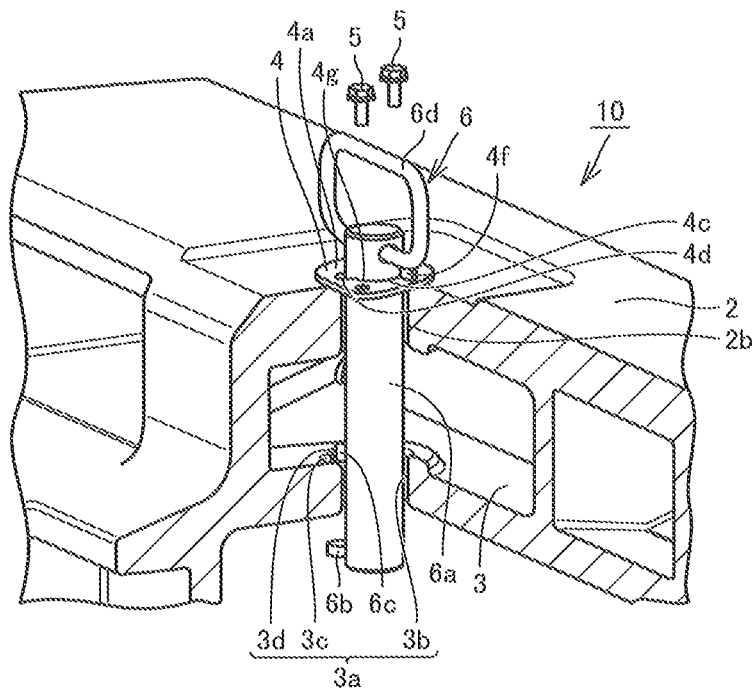
FIG. 12(A) is a perspective view and FIG. 12(B) is a plan view showing a fourth step in the method for assembling the tow apparatus shown in FIG. 3.
Figure 12B:
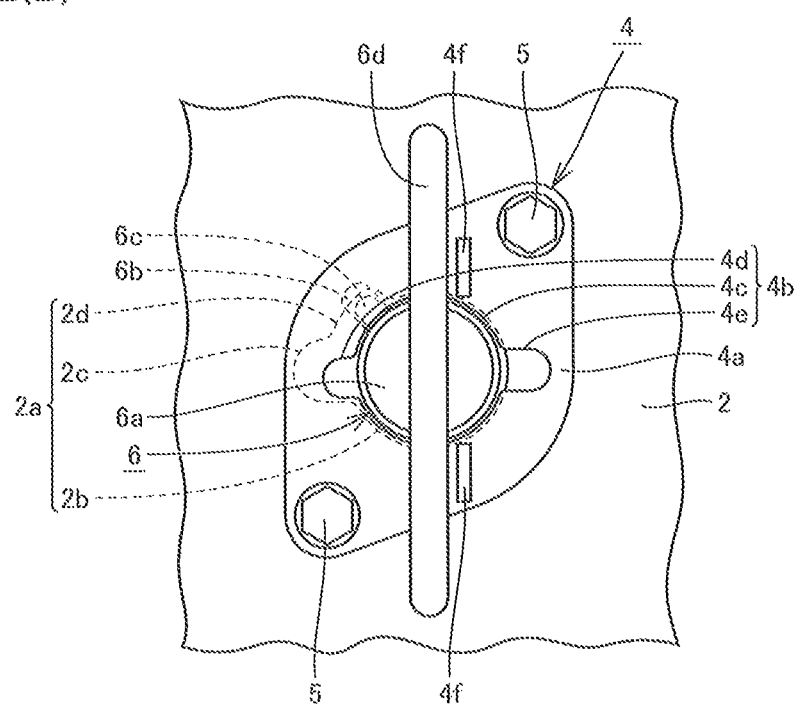

As shown in FIG. 12(A) and FIG. 12(B), after plate 4 is rotated, plate 4 is fixed to upper bracket 2 by fixing member 5. This fixing is achieved, for example, as fixing member 5 implemented by a bolt is screwed into fixing member insertion hole 4g implemented, for example, as a female screw portion through fixing member insertion hole 4g in plate 4. Thereafter, tow pin 6 is rotated around an axial line of main body portion 6a (FIG. 3). As a result of this rotation, a direction of extension of extension portion 6da of handle portion 6d and a direction of extension of rotation stop portion 4f are in parallel to each other. Plate 4 may be fixed to upper bracket 2 after tow pin 6 is rotated.

Figure 13A:
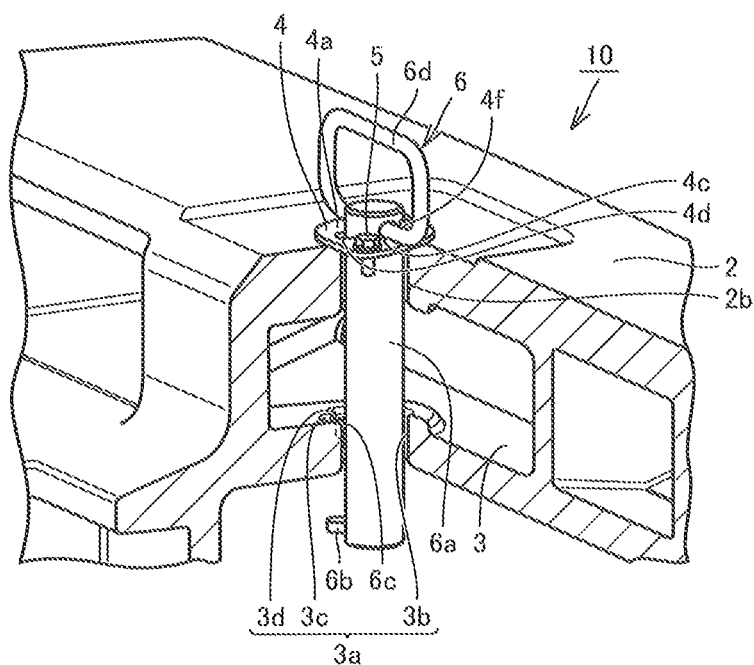
FIG. 13(A) is a perspective view and FIG. 13(B) is a plan view showing a fifth step in the method for assembling the tow apparatus shown in FIG. 3.
Figure 13B:
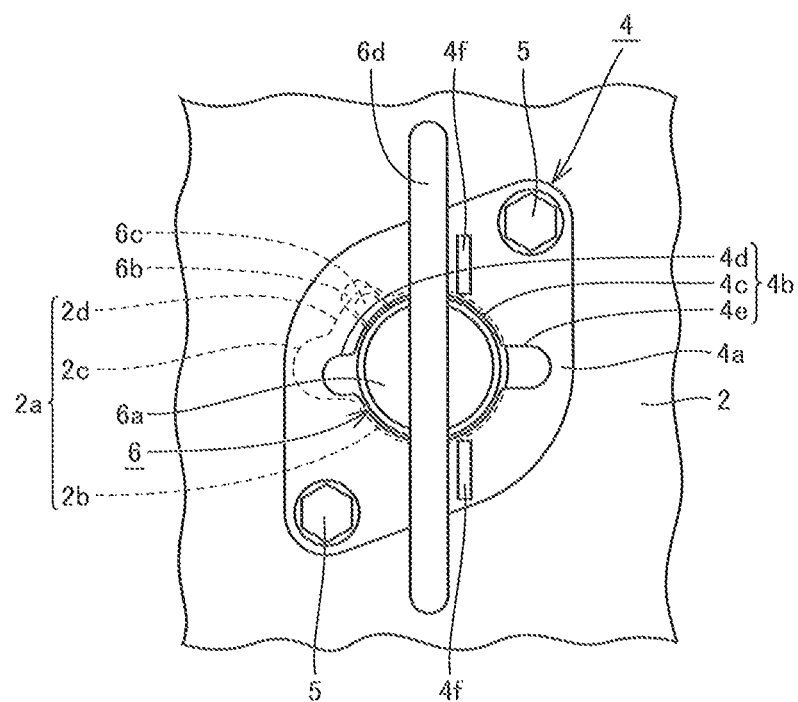

As shown in FIG. 13(A) and FIG. 13(B), tow pin 6 is pulled downward until handle portion 6d abuts to the upper surface of plate 4. In this state, second protrusion 6c is located in recess portion 3d of lower bracket 3. First protrusion 6b is located under lower bracket 3 and directly under recess portion 3d of lower bracket 3.

Tow apparatus 10 is assembled as above so that tow pin 6 is prevented from coming off from upper bracket 2.

A method for operating the tow apparatus in the present embodiment will now be described with reference to FIG. 13(A) and FIG. 13(B) to FIG. 18(A) and FIG. 18 (B).

FIG. 13(A) and FIG. 13(B) to FIG. 18(A) and FIG. 18(B) are perspective views and plan views showing, a method for operating the tow apparatus shown in FIG. 3 in a sequence of steps.

Initially, tow pin 6 is pulled up from the state shown in FIG. 13(A) and FIG. 13 (B).

Figure 14A:
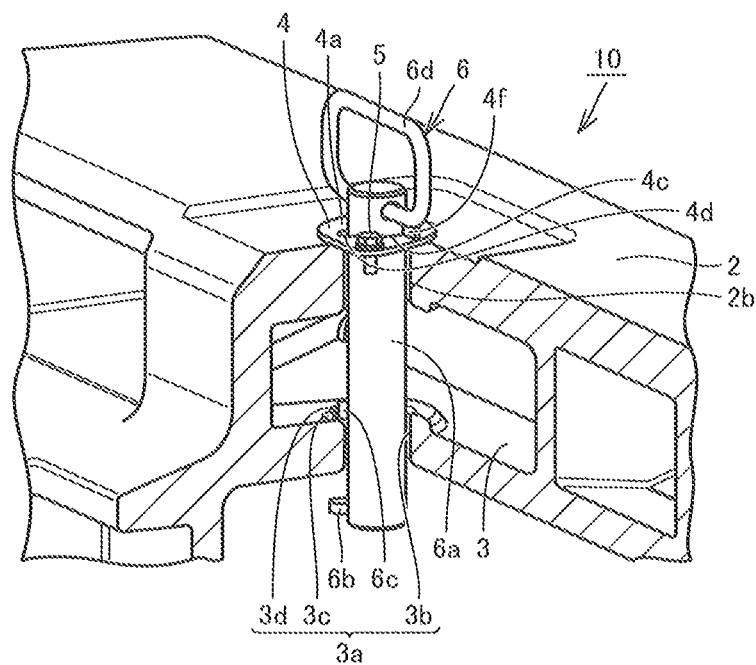
FIG. 14(A) is a perspective view and FIG. 14(B) is a plan view showing a first step in a method for operating, the tow apparatus shown in FIG. 3.
Figure 14B:
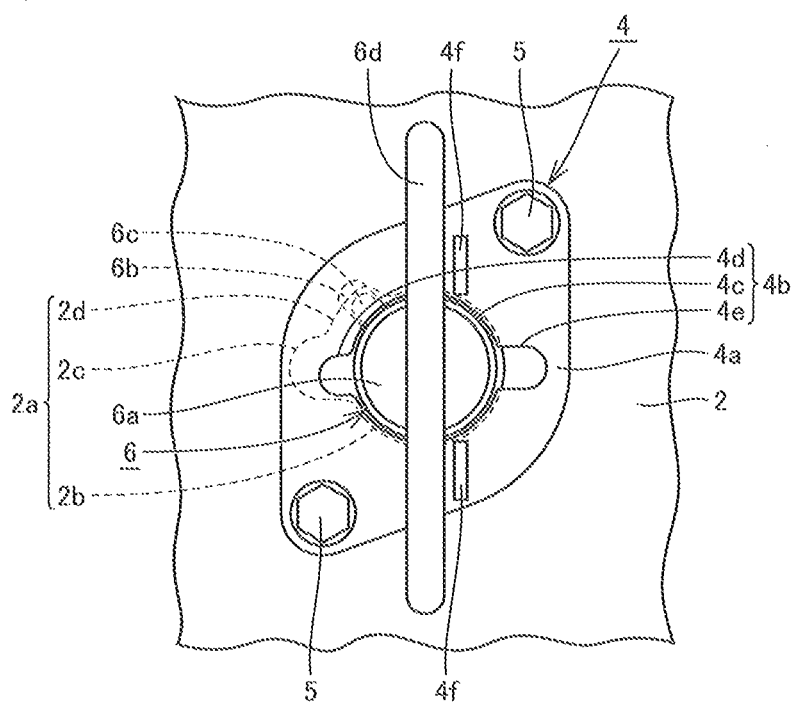

As shown in FIG. 14(A) and FIG. 14(B), as tow pin 6 is pulled up, tow pin 6 moves away from the upper surface of plate 4. A height of pulling up tow pin 6 is equal to or greater than a height of rotation stop portion 4f.

Figure 15A:
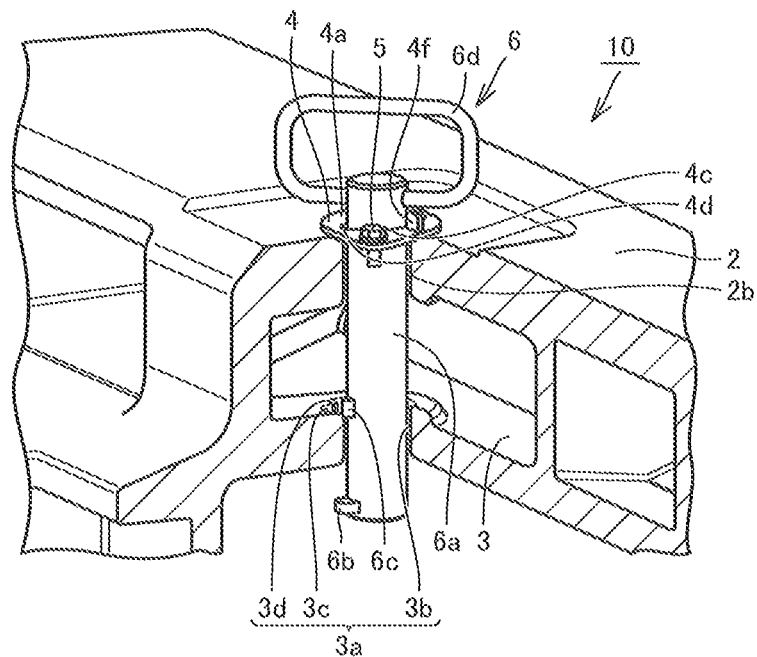
FIG. 15(A) is a perspective view and FIG. 15(B) is a plan view showing a second step in the method for operating the tow apparatus shown in FIG. 3.
Figure 15B:
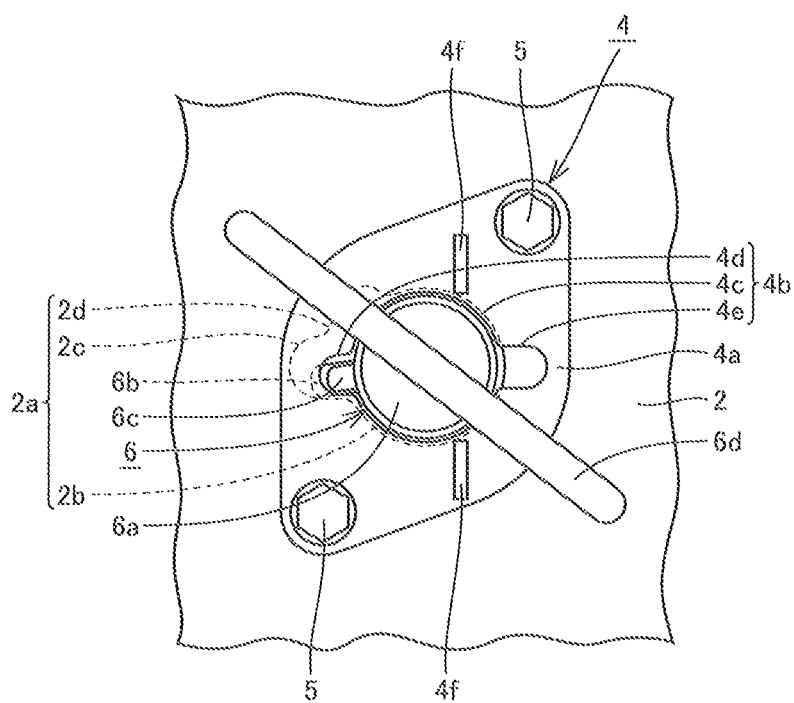

As shown in FIG. 15(A) and FIG. 15(B), tow pin 6 is rotated. Thus, first protrusion 6b of tow pin 6 is located directly under recess portion 3c of lower bracket 3. Tow pin 6 is pulled upward from this state.

Figure 16A:
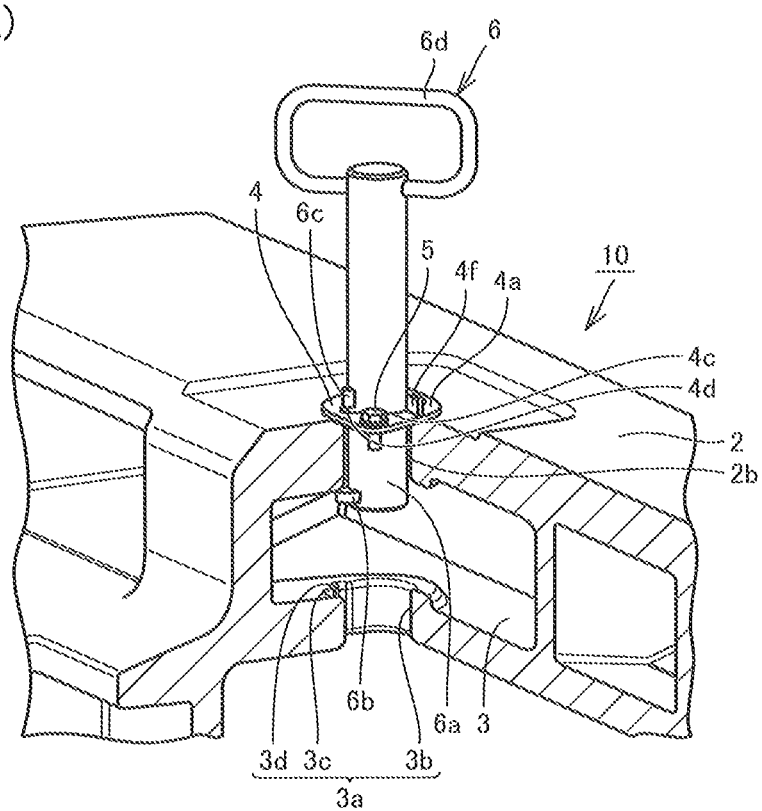
FIG. 16(A) is a perspective view and FIG. 16(B) is a plan view showing a third step in the method for operating the tow apparatus shown in FIG. 3.
Figure 16B:
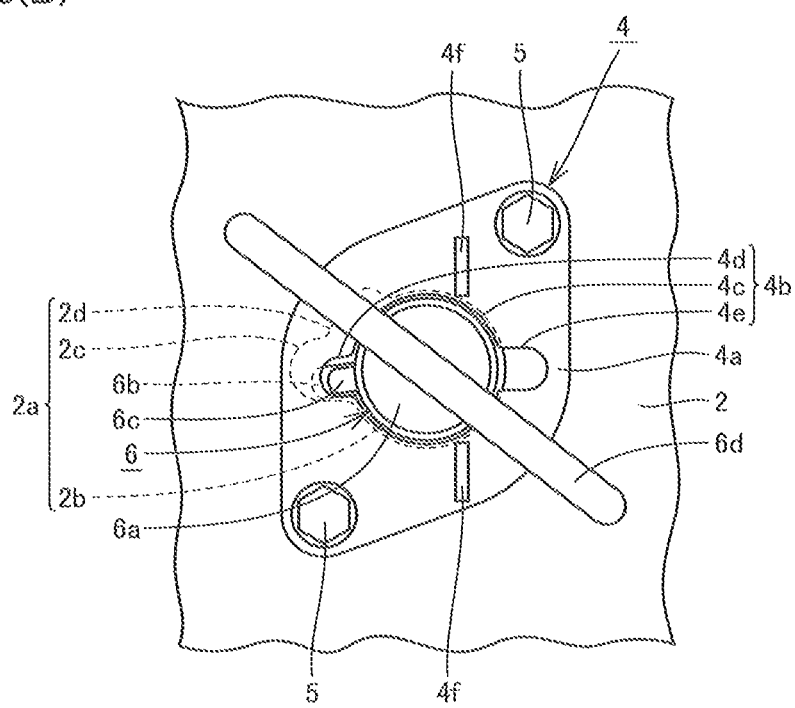

As shown in FIG. 16(A) and FIG. 16(B), as tow pin 6 is pulled upward, second protrusion 6c of tow pin 6 passes through recess portion 8c (FIG. 8) of upper bracket structure 2, 4 and penetrates upper bracket structure 2, 4 upward from below. Thus, second protrusion 6c is located above the upper surface of upper bracket structure 2, 4.

Figure 17A:
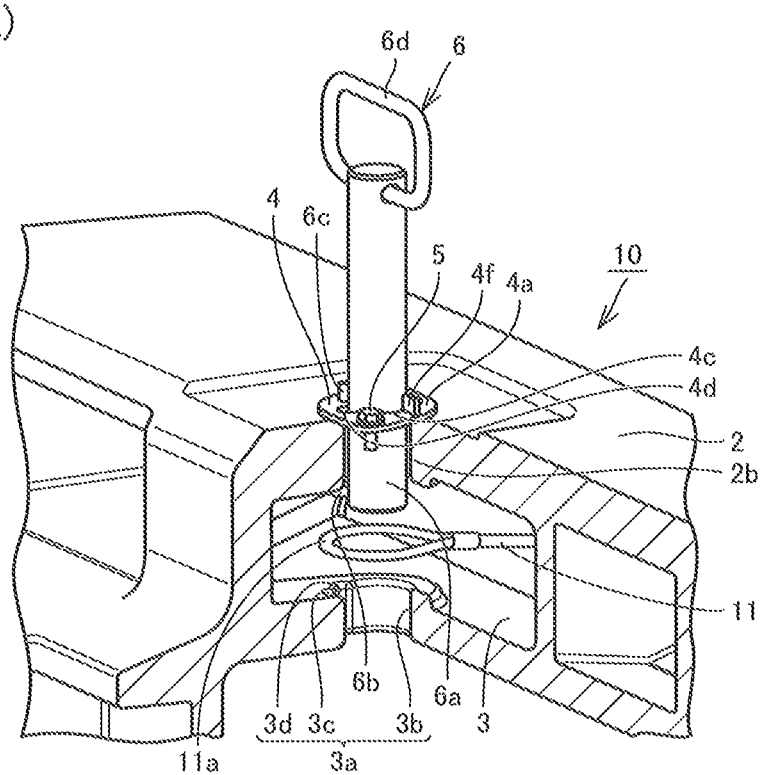
FIG. 17(A) is a perspective view and FIG. 17(B) is a plan view showing a fourth step in the method for operating the tow apparatus shown in FIG. 3.
Figure 17B:
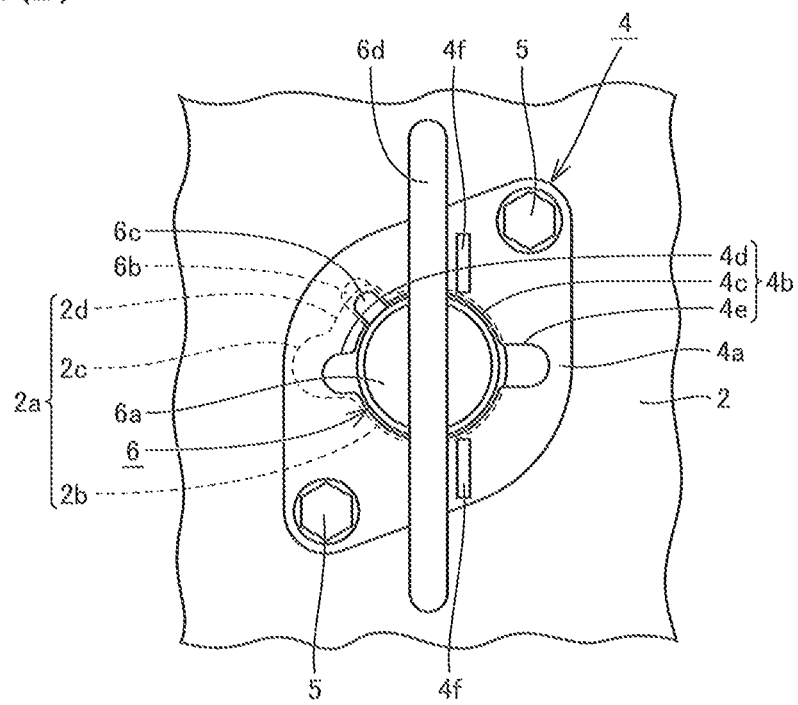

As shown in FIG. 17(A) and FIG. 17(B), after second protrusion 6c is pulled upward above upper bracket structure 2, 4, tow pin 6 is rotated. Thus, second protrusion 6c moves to a position where second protrusion 6c is not superimposed on recess portion 8c (FIG. 8) when viewed in the direction of axis of main body portion 6a. At this position, second protrusion 6c is placed and held on upper bracket structure 2, 4.

While second protrusion 6c is placed and held on upper bracket structure 2, 4, a gap is created between a lower end of tow pin 6 and lower bracket 3. A ring portion 11a of a tow wire 11 is arranged to surround a region directly under tow pin 6 while the gap is created. Thereafter, an operation reverse to the above is performed to thereby pull tow pin 6 downward.

Figure 18A:
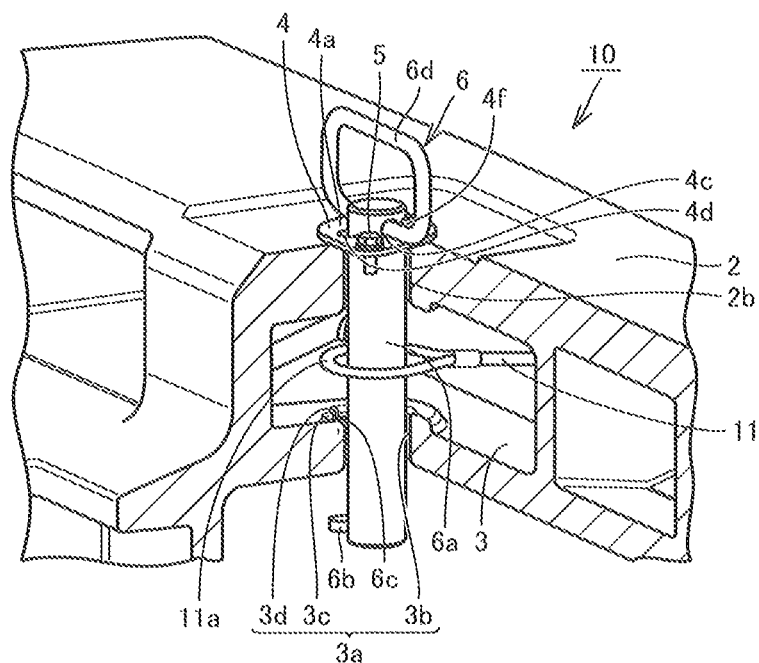
FIG. 18(A) is a perspective view and FIG. 18(B) is a plan view showing a fifth step in the method for operating the tow apparatus shown in FIG. 3.
Figure 18B:
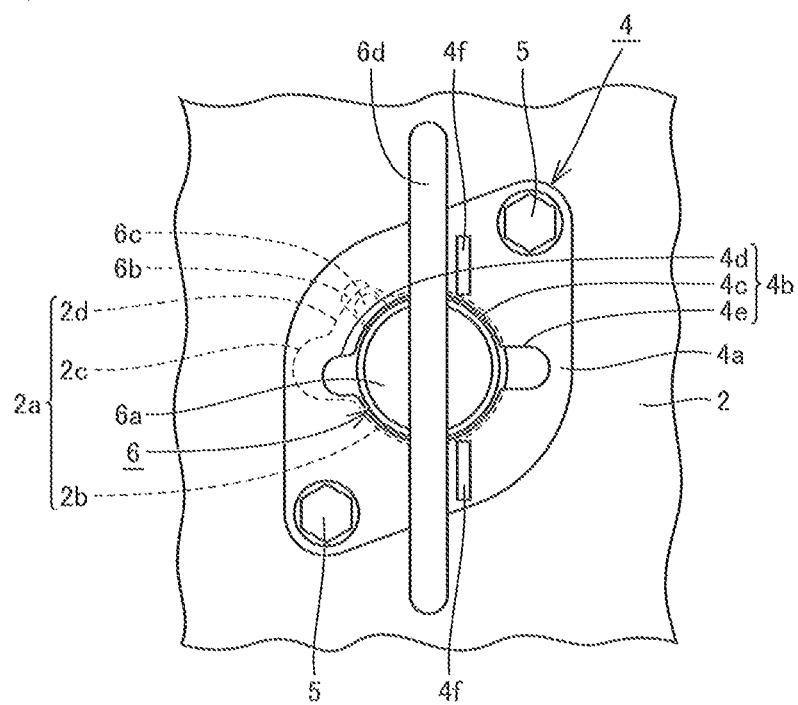

As shown in FIG. 18(A) and FIG. 18(B), as the operation reverse to the above is performed, tow pin 6 is passed through ring portion 11a of tow wire 11. By thus pulling tow pin 6 downward and inserting the tow pin in through hole 3a in lower bracket 3 after tow pin 6 is passed through ring portion 11a of tow wire 11, ring portion 11a of tow wire 11 can be prevented from coming off from tow pin 6.

An operation for attaching the tow wire to tow apparatus 10 can be performed as above.

A function and effect of the present embodiment will now be described.

According to the present embodiment, as shown in FIG. 8, recess portion 8c of upper bracket structure 2, 4 has a two-dimensional shape smaller than the outer circumferential shape of first protrusion 6b. Therefore, so long as main body portion 6a of tow pin 6 is inserted in at least main body insertion portion 8b of upper bracket structure 2, 4 and first protrusion 6b is located under upper bracket structure 2, 4, first protrusion 6b cannot pass through recess portion 8c even though tow pin 6 is pulled upward. Therefore, tow pin 6 cannot be removed upward from upper bracket structure 2, 4 simply by rotating tow pin 6.

In addition, since it is not necessary to use a chain or a wire for preventing tow pin 6 from coming off, a flaw in wheel loader 50 caused by the chain or the wire can be prevented.

Since upper bracket structure 2, 4 is constituted of upper bracket 2 and plate 4, tow pin 6 can be inserted in through hole 8a in upper bracket structure 2, 4 as shown in FIG. 9(A) and FIG. 9(B) to FIG. 13(A) to FIG. 13(B).

As shown in FIG. 3, plate 4 has rotation stop portion 4f protruding upward from flat portion 4a. Thus, as shown in FIG. 12(A) and FIG. 12(B) to FIG. 13(A) and FIG. 13(B), a position where rotation of tow pin 6 is stopped at the time when tow pin 6 is rotated with the tow pin being inserted in through hole 8a in upper bracket structure 2, 4 and through hole 3a in lower bracket 3 can be defined by rotation stop portion 4f.

As shown in FIG. 3, rotation stop portion 4f is located in a trace of rotation of the extension portion of handle portion 6d at the time when main body portion 6a of tow pin 6 is rotated while the main body portion is inserted in main body insertion portion 8b of upper bracket structure 2, 4 and main body insertion portion 3b of lower bracket 3. Thus, as shown in FIG. 12(A) and FIG. 12(B) to FIG. 13(A) and FIG. 13 (B), the extension portion of handle portion 6d can abut to rotation stop portion 4f and this position of abutment can be defined as the position where rotation of tow pin 6 is stopped.

As shown in FIG. 3, a protrusion dimension by which second protrusion 6c of tow pin 6 protrudes outward is smaller than a protrusion dimension by which first protrusion 6b protrudes outward. As shown in FIG. 7(A), recess portion 8c of upper bracket structure 2, 4 has a two-dimensional shape greater than the outer circumferential shape of second protrusion 6c. After second protrusion 6c is moved upward from below upper bracket structure 2, 4 through recess portion 8c as shown in FIG. 16(A) and FIG. 16(B), the tow pin is rotated such that the second protrusion is displaced from directly above recess portion 8c as shown in FIG. 17(A) and FIG. 17(B), so that second protrusion 6c can be placed and held on upper bracket structure 2, 4. Since a worker no longer has to hold tow pin 6 with his/her hand, he/she can handle tow wire 11 with both hands and operability in towing can be improved.

As shown in FIG. 3, the interval in the vertical direction between first protrusion 6b and second 6c is equal to or greater than the thickness in the vertical direction of upper bracket structure 2, 4. Thus, as shown in FIG. 15(A) to FIG. 16(A), first protrusion 6b does not abut to the lower surface of upper bracket structure 2, 4 until second protrusion 6c penetrates upper bracket structure 2, 4 upward from below when second protrusion 6c is moved upward above upper bracket structure 2, 4. Therefore, first protrusion 6b is prevented from interfering with movement of second protrusion 6c.

As shown in FIG. 3, the interval in the vertical direction between first protrusion 6b and second protrusion 6c is equal to or greater than the thickness in the vertical direction of lower bracket 3. Thus, first protrusion 6b can be prevented from interfering with rotational movement of second protrusion 6c as a result of abutment of the first protrusion to lower bracket 3 when second protrusion 6c is placed and held on lower bracket 3 as being displaced from directly above recess portion 3c of lower bracket 3 as a result of rotation.

As shown in FIG. 3, second protrusion 6c is located directly above first protrusion 6b along the direction of axis of the columnar shape of main body portion 6a. Thus, positioning of first protrusion 6b and second protrusion 6c is facilitated and design of recess portion 8c of upper bracket structure 2, 4 and recess portion 3c of lower bracket 3 is facilitated.

As shown in FIG. 5, recess portion 3d of lower bracket 3 is connected to recess portion 3c. Thus, second protrusion 6c of tow pin 6 can rotate in recess portion 3c and recess portion 3d. By positioning second protrusion 6c in recess portion 3d, recess portion 3d is located directly above first protrusion 6b. Therefore, in this state, first protrusion 6b cannot pass through lower bracket 3 even though upward force is applied to tow pin 6. Therefore, vertical swing of tow pin 6 can be suppressed.

As shown in FIG. 18(A), with main body portion 6a of tow pin 6 being inserted in main body insertion portion 8b of upper bracket structure 2, 4 and main body insertion portion 3b of lower bracket 3, second protrusion 6c is arranged in any of recess portion 3c and recess portion 3d of lower bracket 3. Thus, even when tow wire 11 is attached to main body portion 6a of tow pin 6, tow wire 11 can be prevented from coming in contact with second protrusion 6c. Thus, damage of second protrusion 6c by tow wire 11 can be prevented.

As shown in FIG. 17(A), while second protrusion 6c is placed and held on upper bracket structure 2, 4, a gap is created between the lower end of tow pin 6 and lower bracket 3. With the gap being created, tow pin 6 is rotated with respect to upper bracket structure 2, 4 such that second protrusion 6c moves to a position where the second protrusion is superimposed on recess portion 8c of upper bracket structure 2, 4 when viewed in the direction of axis. Tow pin 6 is pulled downward such that second protrusion 6c passes through recess portion 8c and moves below upper bracket structure 2, 4 and main body portion 6a of tow pin 6 is inserted in main body insertion portion 8b of upper bracket structure 2, 4 and main body insertion portion 3b of lower bracket 3 after tow pin 6 is rotated as shown in FIG. 18(A). As tow pin 6 is pulled downward, tow pin 6 is passed through ring portion 11a of tow wire 11 by making use of the gap. Thus, by pulling tow pin 6 downward and inserting the tow pin in through hole 3a in lower bracket 3 after tow pin 6 is passed through ring portion 11a of tow wire 11, ring portion 11a of tow wire 11 can be prevented from coming off from tow pin 6.

As shown in FIG. 13(A) and FIG. 13(B), tow pin 6 is rotated with respect to lower bracket 3 such that first protrusion 6b moves to a position where the first protrusion is not superimposed on recess portion 3c of lower bracket 3 when viewed in the direction of axis after tow pin 6 is pulled down until handle portion 6d of tow pin 6 abuts to the upper surface of plate 4. As first protrusion 6b is thus displaced from directly under recess portion 3c, first protrusion 6b cannot pass through through hole 3a in lower bracket 3 even though upward force is applied to tow pin 6. Therefore, vertical swing of tow pin 6 can be suppressed.

As shown in FIG. 9(A) and FIG. 9(B), during assembly of tow apparatus 10, recess portion 4e of plate 4 is located directly above recess portion 2c of upper bracket 2. Thus, as shown in FIG. 10(A), first protrusion 6b of tow pin 6 can penetrate through hole 8a in upper bracket structure 2, 4. After tow pin 6 penetrates upper bracket 2, recess portion 4d of plate 4 is located directly above recess portion 2c of upper bracket 2 as shown in FIG. 11(A) and FIG. 11(B), so that first protrusion 6b of tow pin 6 can no longer penetrate through hole 8a in upper bracket structure 2, 4. Thus, tow pin 6 can be attached so as not to come off from upper bracket structure 2, 4 and lower bracket 3.

Though the embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

REFERENCE SIGNS LIST 1 counterweight; 2 upper bracket; 2a, 3a, 4b, 8a through hole; 2b, 3b, 4c, 8b main body insertion portion; 2c, 2d, 3c, 3d, 4d, 4e, 8c recess portion; 2e female screw portion; 3 bracket; 4 plate; 4a flat portion; 4f rotation stop portion; 4g fixing member insertion hole; 5 bolt (fixing member); 6 tow pin; 6a main body portion; 6b first protrusion; 6c second protrusion; 6d handle portion; 6da extension portion; 10 tow apparatus; 11 tow wire; 11a ring portion; 30 work implement; 31 boom; 32 bucket; 33 boom cylinder; 34 bell crank; 35 bucket cylinder; 36 link; 41 operator's cab; 42 front frame; 43a front wheel; 43b rear wheel; 44 rear vehicular body; 44a hydraulic oil tank; 44b engine compartment; 44c pivot plate; and 50 wheel loader.

The invention claimed is:

1. A work vehicle having a tow apparatus, comprising:
a tow pin having a main body portion in a columnar shape and a first protrusion protruding outward from an outer circumferential surface of the main body portion;
an upper bracket structure having a first through hole in which the main body portion is inserted, and restricting passage of the first protrusion; and
a lower bracket located under the upper bracket structure at a distance from the upper bracket structure and having a second through hole in which the tow pin can be inserted,
wherein the main body portion of the tow pin is inserted in at least the first through hole and the first protrusion is located under the upper bracket structure, and
wherein
the first through hole has
a first main body insertion portion having a two-dimensional shape greater than an outer circumferential shape of the columnar shape of the main body portion, and
a first recess portion connected to an outer circumference of the first main body insertion portion and having a two-dimensional shape smaller than an outer circumferential shape of the first protrusion, and the second through hole has
- a second main body insertion portion having a two-dimensional shape greater than the outer circumferential shape of the columnar shape of the main body portion, and
- a second recess portion connected to an outer circumference of the second main body insertion portion and having a two-dimensional shape greater than the outer circumferential shape of the first protrusion.

2. The work vehicle according to claim 1, wherein
the upper bracket structure has an upper bracket having a third through hole and a plate arranged on the upper bracket and having a fourth through hole,
the third through hole has a third main body insertion portion having a two-dimensional shape greater than the outer circumferential shape of the columnar shape of the main body portion and a third recess portion connected to an outer circumference of the third main body insertion portion and having a two-dimensional shape greater than the outer circumferential shape of the first protrusion,
the fourth through hole has a fourth main body insertion portion having a two-dimensional shape greater than the outer circumferential shape of the columnar shape of the main body portion, a fourth recess portion connected to an outer circumference of the fourth main body insertion portion and having a two-dimensional shape smaller than the outer circumferential shape of the first protrusion, and a fifth recess portion connected to the outer circumference of the fourth main body insertion portion and having a two-dimensional shape greater than the outer circumferential shape of the first protrusion, and
the third main body insertion portion and the fourth main body insertion portion implement the first main body insertion portion as being vertically superimposed on each other, and the third recess portion and the fourth recess portion implement the first recess portion as being vertically superimposed on each other.

3. The work vehicle according to claim 2, wherein
the plate has a flat portion having the fourth main body insertion portion and the fourth recess portion and a rotation stop portion connected to the flat portion and protruding upward from the flat portion.

4. The work vehicle according to claim 3, wherein
the tow pin includes a handle portion arranged in the main body portion,
the handle portion has an extension portion protruding outward from the outer circumferential surface of the main body portion, and
the rotation stop portion is located in a trace of rotation of the extension portion when the main body portion of the tow pin is rotated while the main body portion is inserted in the first main body insertion portion and the second main body insertion portion.

5. The work vehicle according claim 2, wherein
the tow pin has a second protrusion,
the second protrusion protrudes outward from the outer circumferential surface of the main body portion above the first protrusion and has a protrusion dimension smaller than an outward protrusion dimension of the first protrusion, and
the first recess portion has a two-dimensional shape greater than an outer circumferential shape of the second protrusion.

6. The work vehicle according to claim 5, wherein
an interval in a vertical direction between the first protrusion and the second protrusion is equal to or greater than a thickness in the vertical direction of the upper bracket structure.

7. The work vehicle according to claim 5, wherein
an interval in a vertical direction between the first protrusion and the second protrusion is equal to or greater than a thickness in the vertical direction of the lower bracket.

8. The work vehicle according to claim 5, wherein
the second protrusion is located directly above the first protrusion along a direction of axis of the columnar shape of the main body portion.

9. The work vehicle according to claim 5, wherein
the second through hole has a sixth recess portion connected to the outer circumference of the second main body insertion portion and having a two-dimensional shape smaller than the outer circumferential shape of the first protrusion and greater than the outer circumferential shape of the second protrusion, and
the sixth recess portion is connected to the second recess portion.

10. The work vehicle according to claim 9, wherein
the second protrusion is arranged in any of the second recess portion and the sixth recess portion while the main body portion of the tow pin is inserted in the second main body insertion portion and the third main body insertion portion.

11. A method for operating a tow apparatus in the work vehicle according to claim 5, comprising the steps of:
pulling the tow pin upward such that the second protrusion passes through the first recess portion to be located above the upper bracket structure from a state that the main body portion of the tow pin is inserted in the second main body insertion portion and the third main body insertion portion; and
placing and holding the second protrusion on the upper bracket structure by rotating the tow pin with respect to the upper bracket structure such that the second protrusion moves to a position where the second protrusion is not superimposed on the first recess portion when viewed in the direction of axis of the columnar shape of the main body portion after pulling the tow pin upward.

12. The method for operating a tow apparatus according to claim 11, wherein
a gap is created between a lower end of the tow pin and the lower bracket while the second protrusion is placed and held on the upper bracket structure,
the method further comprises the steps of:
rotating the tow pin with respect to the upper bracket structure such that the second protrusion moves to a position where the second protrusion is superimposed on the second through hole when viewed in the direction of axis while the gap is created; and
pulling the tow pin downward such that the second protrusion passes through the first recess portion and moves below the upper bracket structure and the tow pin is inserted in the first through hole and the second through hole after the tow pin is rotated, and
the tow pin is passed through a ring portion of a tow wire by making use of the gap, by pulling the tow pin downward.

13. The method for operating a tow apparatus according to claim 12, wherein
the step of pulling the tow pin downward includes the step of pulling the tow pin downward until the first protrusion passes through the second recess portion and is located under the lower bracket, and the method further comprises the step of rotating the tow pin with respect to the lower bracket such that the first protrusion moves to a position where the first protrusion is not superimposed on the second recess portion when viewed in the direction of axis while the first protrusion is located under the lower bracket.

14. A method for assembling the tow apparatus in the work vehicle according to claim 2, comprising the steps of:

arranging the plate on the upper bracket such that the fourth main body insertion portion of the plate is located directly above the third main body insertion portion of the upper bracket and the fifth recess portion of the plate is located directly above the third recess portion of the upper bracket;

inserting the main body portion of the tow pin through the fourth main body insertion portion of the plate and the third main body insertion portion of the upper bracket and inserting the first protrusion of the tow pin through the fifth recess portion of the plate and the third recess portion of the upper bracket;

rotating the plate around the main body portion with respect to the upper bracket such that the fourth recess portion of the plate is located directly above the third recess portion of the upper bracket after the first protrusion of the tow pin is inserted through the fifth recess portion and the third recess portion; and fixing the plate to the upper bracket while the fourth recess portion is located directly above the third recess portion.

* * * * *